(12) United States Patent
Fong et al.

(10) Patent No.: US 11,983,338 B1
(45) Date of Patent: May 14, 2024

(54) CAPACITIVE KNOB SENSING SYSTEM AND METHOD USING TRANSPARENT SENSING

(71) Applicant: Synaptics Incorporated, San Jose, CA (US)

(72) Inventors: Kelvin Fong, Milpitas, CA (US); Danny Joseph, Fribourg (CH)

(73) Assignee: Synaptics Incorporated, San Jose, CA (US)

( * ) Notice: Subject to any disclaimer, the term of this patent is extended or adjusted under 35 U.S.C. 154(b) by 0 days.

(21) Appl. No.: 18/166,969

(22) Filed: Feb. 9, 2023

(51) Int. Cl.
| | |
|---|---|
| *G01P 13/04* | (2006.01) |
| *G01L 1/14* | (2006.01) |
| *G06F 3/0362* | (2013.01) |
| *G06F 3/038* | (2013.01) |
| *G06F 3/041* | (2006.01) |
| *G06F 3/044* | (2006.01) |
| *H01H 19/14* | (2006.01) |

(52) U.S. Cl.
CPC ............ *G06F 3/0383* (2013.01); *G01L 1/142* (2013.01); *G01P 13/04* (2013.01); *G06F 3/0362* (2013.01); *G06F 3/04162* (2019.05); *G06F 3/0441* (2019.05); *G06F 3/0446* (2019.05); *H01H 19/14* (2013.01)

(58) Field of Classification Search
CPC .. G06F 3/0362; G06F 3/04162; G06F 3/0446; G06F 3/0441; G06F 3/0383; G01P 13/04; G01L 1/142
See application file for complete search history.

(56) References Cited

U.S. PATENT DOCUMENTS

| | | |
|---|---|---|
| 10,921,913 B1 | 2/2021 | Fong et al. |
| 11,256,376 B2 | 2/2022 | Fong et al. |
| 2021/0232260 A1 | 7/2021 | Fong et al. |
| 2022/0214764 A1 | 7/2022 | Fong |
| 2022/0244810 A1 | 8/2022 | Fong |

*Primary Examiner* — Abbas I Abdulselam
(74) *Attorney, Agent, or Firm* — Leydig, Voit & Mayer, Ltd.

(57) ABSTRACT

A system for using a transparent conductive material layer for a knob interface is provided. The system comprises: the knob interface comprising a fixed base and one or more knob interface electrodes; the transparent conductive material layer configured to electrically couple the subset of the plurality of grid electrodes to the one or more knob interface electrodes; and a processing system. The processing system is configured to: drive the plurality of grid electrodes with one or more signals; receive one or more resulting signals based on driving the plurality of grid electrodes with the one or more signals; and perform one or more actions based on the one or more resulting signals.

20 Claims, 26 Drawing Sheets

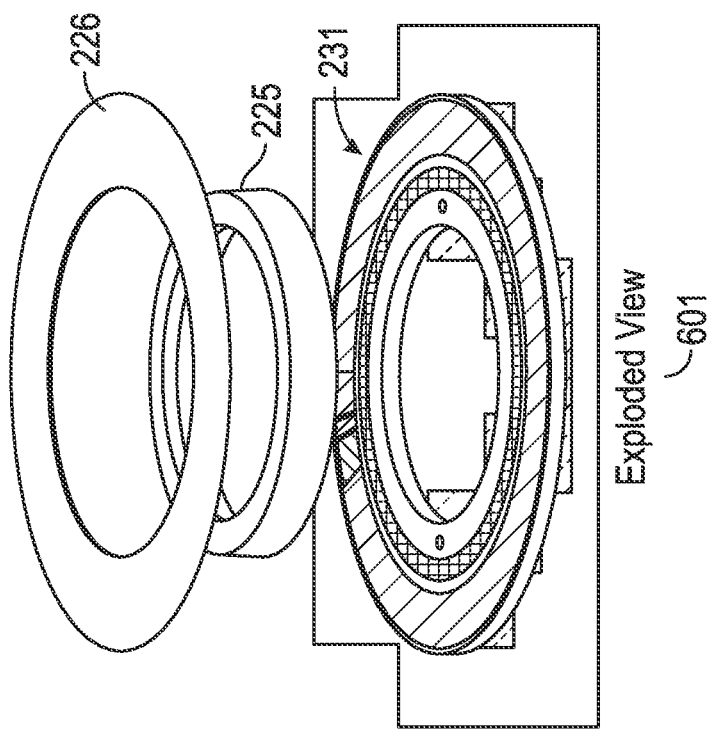
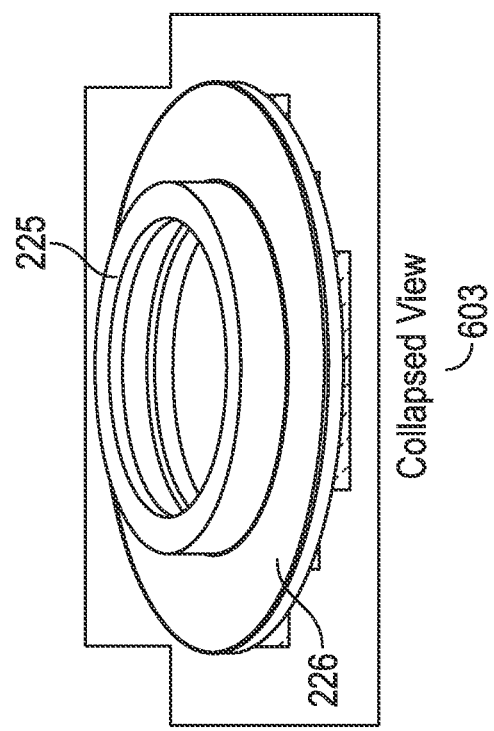
Figure 6A

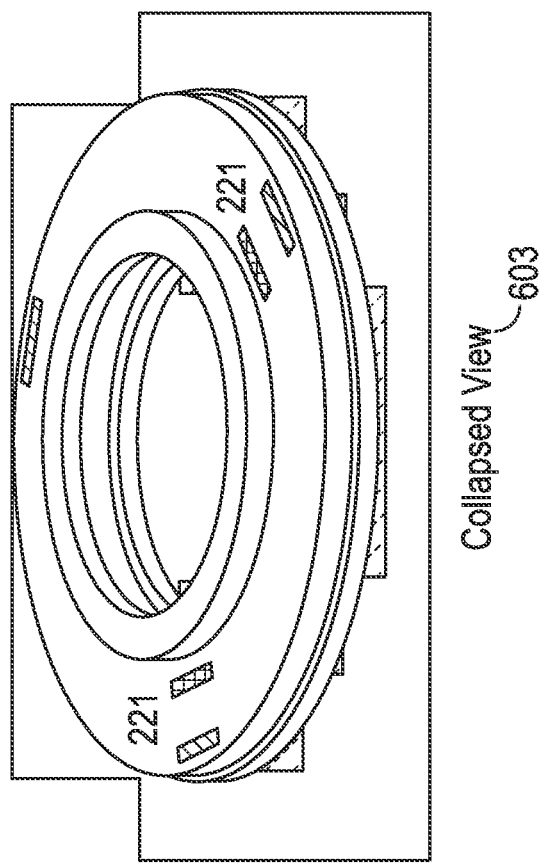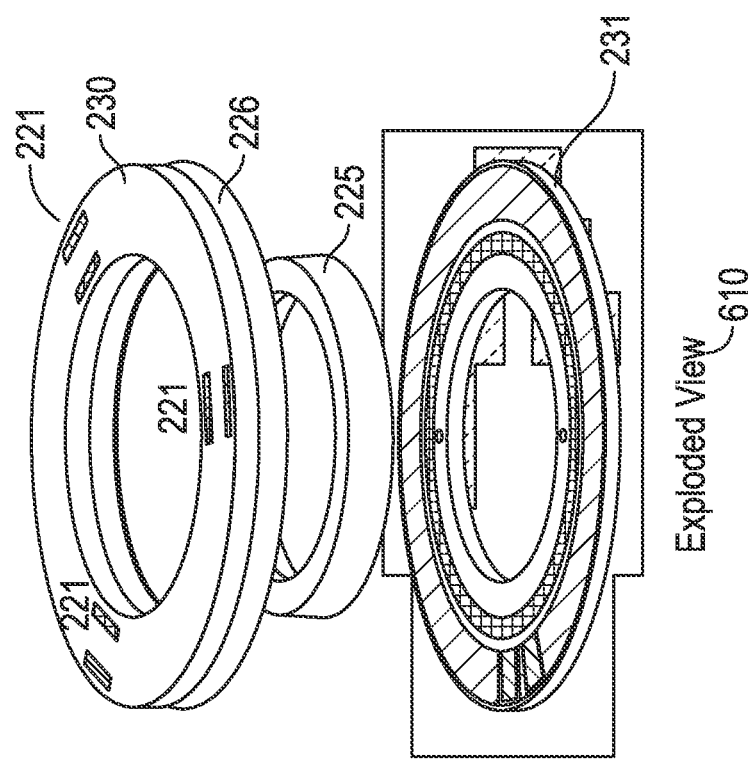
Figure 6B

Knob Hardware 1510

Protective Film 1508

Knob Hardware 1510

Transparent Conductive Material 1506

Transparent Film 1504

Optically Clear Adhesive 1502

Cover Glass 1429

Figure 15

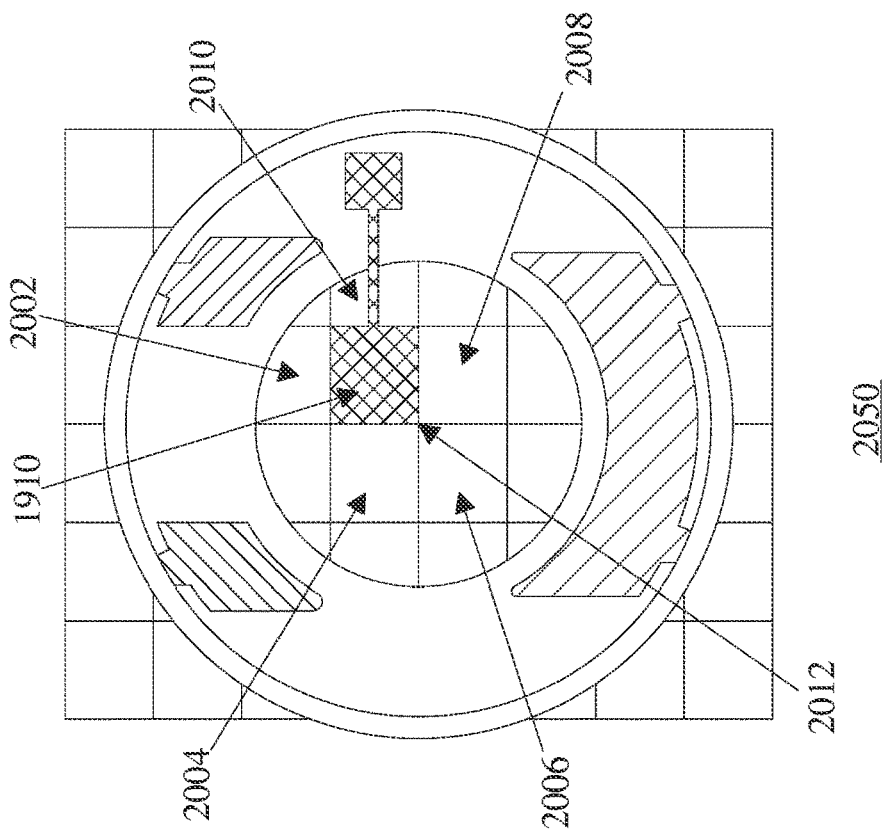
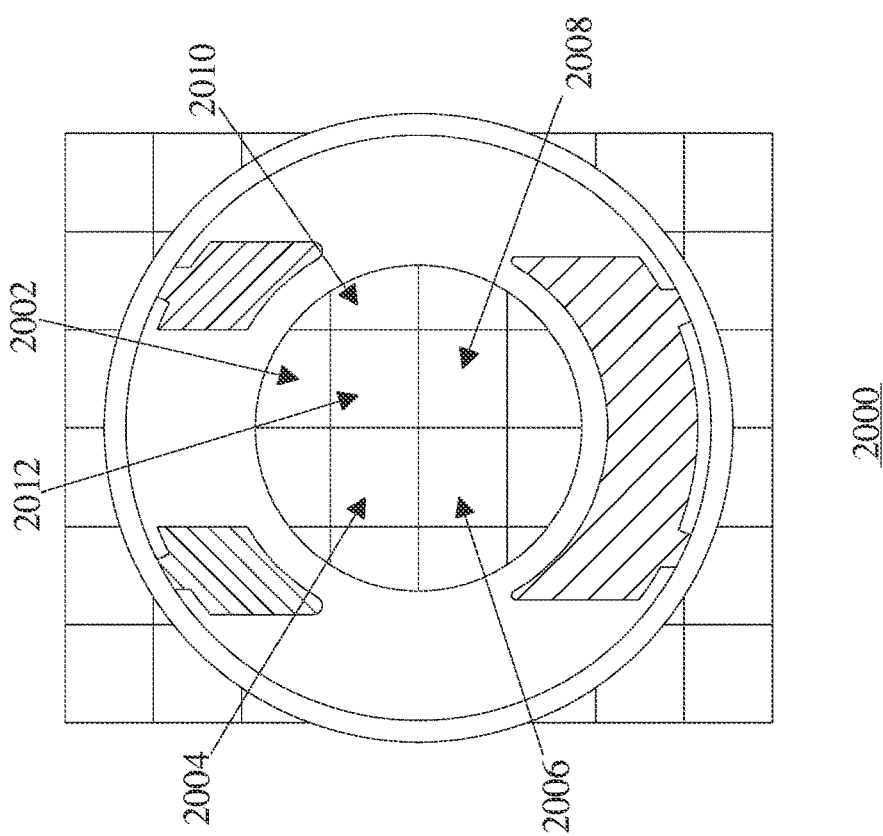
Figure 20

CAPACITIVE KNOB SENSING SYSTEM AND METHOD USING TRANSPARENT SENSING

TECHNICAL FIELD

This disclosure relates generally to a rotatable knob interface.

BACKGROUND

Input devices including proximity sensor devices may be used in a variety of electronic systems. A proximity sensor device may include a sensing region, demarked by a surface, in which the proximity sensor device determines the presence, location, force and/or motion of one or more input objects. Proximity sensor devices may be used to provide interfaces for the electronic system. For example, proximity sensor devices may be used as input devices for larger computing systems, such as touchpads integrated in, or peripheral to, notebook or desktop computers. Proximity sensor devices may also often be used in smaller computing systems, such as touch screens integrated in cellular phones. Additionally, proximity sensor devices may be implemented as part of a multi-media entertainment system of an automobile. In such cases, it is useful to interface a knob to a proximity sensor device.

Traditionally, the knob interface may include a donut shaped exterior with a center area that is free of any opaque conductive material so as to allow the display of information within this center area. Furthermore, in some examples, the center area may also be used for touch detection (e.g., detecting a user's finger in the center area). To perform these functionalities, the knob interface avoids using touch pixels (e.g., sensor electrodes) within the center area and instead, only uses the touch pixels that are located on the donut shaped exterior. However, some knob interface designs may use larger inner diameters and smaller outer diameters for the donut shaped exterior, which limits the space that can be used to capacitively couple the knob hardware and the touch pixels. This limits the functionalities and features that can be configured for the knob interface and impacts the minimize size of the knob interface.

SUMMARY

This summary is provided to introduce a selection of concepts in a simplified form that are further described below. This summary is not intended to necessarily identify key features or essential features of the present disclosure. The present disclosure may include the following various aspects and embodiments.

In an exemplary embodiment, the present disclosure provides a system for using a transparent conductive material layer for a knob interface. The system comprises: the knob interface comprising a fixed base and one or more knob interface electrodes, wherein the fixed base comprises an outer diameter and an inner diameter; a plurality of grid electrodes positioned below the knob interface, wherein a subset of the plurality of grid electrodes are positioned within the inner diameter of the fixed base; the transparent conductive material layer configured to electrically couple the subset of the plurality of grid electrodes to the one or more knob interface electrodes; and a processing system configured to: drive the plurality of grid electrodes with one or more signals, wherein driving the plurality of grid electrodes comprises driving the subset of the plurality of grid electrodes that are electrically coupled to the one or more knob interface electrodes via the transparent conductive material layer; receive one or more resulting signals based on driving the plurality of grid electrodes with the one or more signals; and perform one or more actions based on the one or more resulting signals.

In another exemplary embodiment, the present disclosure provides a method for using a transparent conductive material layer for a knob interface, comprising: driving a plurality of grid electrodes with one or more signals, wherein the knob interface comprises a fixed base and one or more knob interface electrodes, wherein the fixed base comprises an outer diameter and an inner diameter, wherein the plurality of grid electrodes are positioned below the knob interface, wherein a subset of the plurality of grid electrodes are positioned within the inner diameter of the fixed base, wherein the transparent conductive material layer is configured to electrically couple the subset of the plurality of grid electrodes to the one or more knob interface electrodes, and wherein driving the plurality of grid electrodes comprises driving the subset of the plurality of grid electrodes that are electrically coupled to the one or more knob interface electrodes via the transparent conductive material layer; receiving one or more resulting signals based on driving the plurality of grid electrodes with the one or more signals; and performing one or more actions based on the one or more resulting signals.

In yet another exemplary embodiment, the present disclosure provides a non-transitory computer-readable medium having processor-executable instructions stored thereon, the processor-executable instructions, when executed, facilitating performance of the following: driving a plurality of grid electrodes with one or more signals, wherein the knob interface comprises a fixed base and one or more knob interface electrodes, wherein the fixed base comprises an outer diameter and an inner diameter, wherein the plurality of grid electrodes are positioned below the knob interface, wherein a subset of the plurality of grid electrodes are positioned within the inner diameter of the fixed base, wherein the transparent conductive material layer is configured to electrically couple the subset of the plurality of grid electrodes to the one or more knob interface electrodes, and wherein driving the plurality of grid electrodes comprises driving the subset of the plurality of grid electrodes that are electrically coupled to the one or more knob interface electrodes via the transparent conductive material layer; receiving one or more resulting signals based on driving the plurality of grid electrodes with the one or more signals; and performing one or more actions based on the one or more resulting signals.

Further features and aspects are described in additional detail below with reference to the FIGS.

BRIEF DESCRIPTION OF THE DRAWINGS

FIG. 6A illustrates exploded and collapsed views of the example fixed base and example plastic bearings shown in FIG. 3 according to one or more examples of the present disclosure.

FIG. 6B illustrates the respective exploded and collapsed views shown in FIG. 6A, with the addition of the example rotary wheel of FIG. 3 provided on top of an example flat ring-shaped bearing according to one or more examples of the present disclosure.

FIG. 15 depicts another schematic cross-section of an example rotatable knob interface, implemented on an example input device having a sensing grid, according to one or more examples.

FIG. 20 illustrates yet another underside view of the fixed base of example rotatable knob interfaces according to one or more examples of the present disclosure.

DETAILED DESCRIPTION

Figure 1:
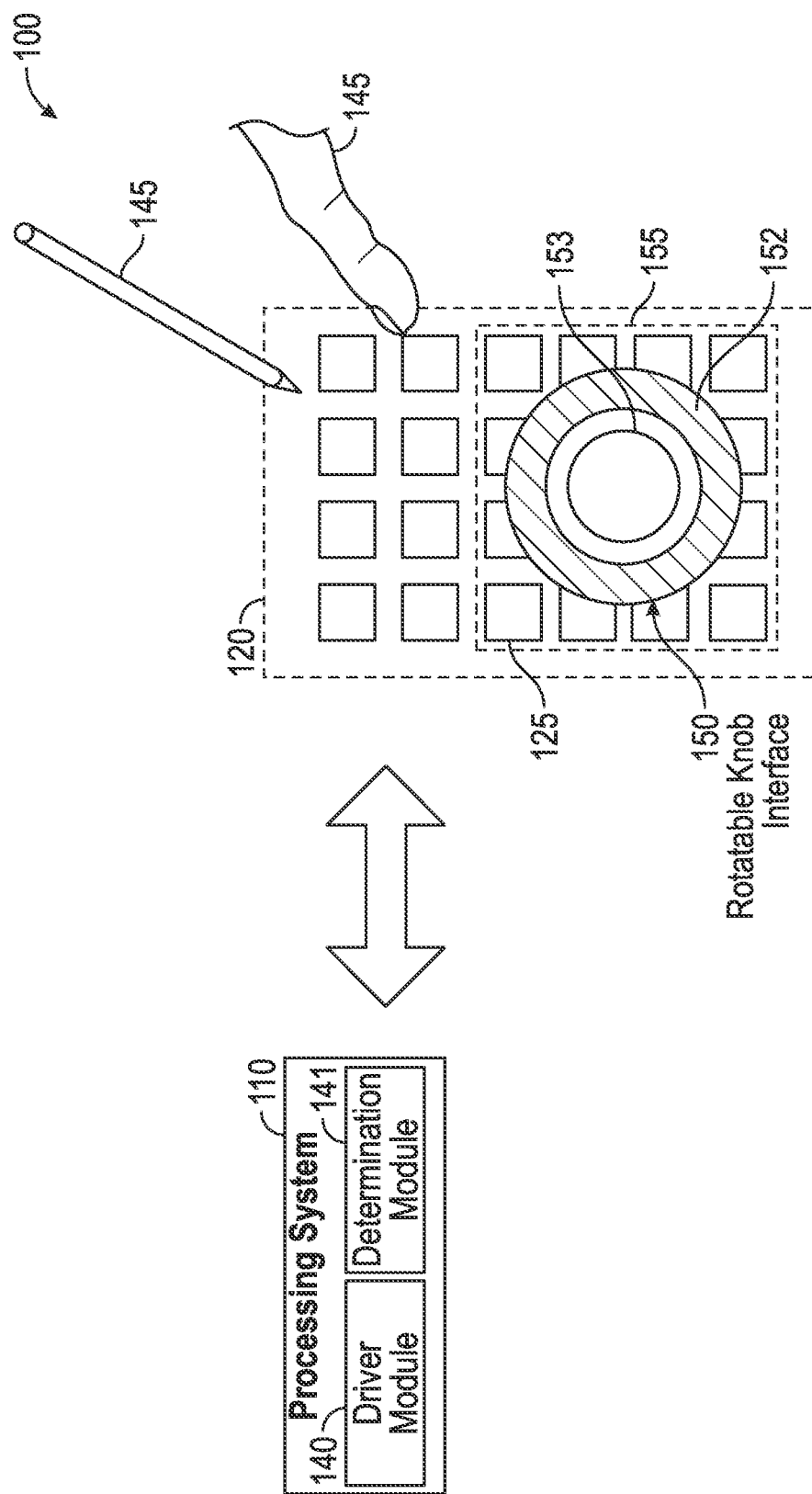
FIG. 1 illustrates an example input device with a rotatable knob interface according to one or more examples of the present disclosure.

The following detailed description is exemplary in nature and is not intended to limit the disclosure or the application and uses of the disclosure. Furthermore, there is no intention to be bound by any expressed or implied theory presented in the preceding background, summary and brief description of the drawings, or the following detailed description.

In the following detailed description, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Various examples of the present disclosure provide input devices and methods that use a transparent conductive material (e.g., metal-mesh or indium tin oxide (ITO)). By using the transparent conductive material, more sensing electrodes may be used, which, in return, may lead to a better signal to noise ratio (SNR) (e.g., by using more electrodes for ground (GND)/guard) and/or permit the input device (e.g., the knob interface) to include more functionality/functions such as click, grab, and/or additional functionalities. In some instances, the transparent conductive material may be used for the center area of the knob interface. For example, as will be described in further detail below, the knob interface may include a circular knob region that encompasses an interior section. The circular knob region (e.g., a donut shaped region) may include an exterior diameter and an interior diameter. The center area may be within the interior diameter of the circular knob region, and the transparent conductive material may be used for the sensing electrodes within the center area to provide electric conductivity. In other instances, the transparent conductive material may be used for sensing electrodes within the center area, the circular knob region, and/or other regions. For instance, in some examples, the transparent conductive material may be used for all of the sensing electrodes of the knob interface.

In some variations, by using the transparent conductive material, the sensor electrodes associated with the transparent conductive material (e.g., electrically coupled to the transparent conductive material) may be used for additional sensing functions. For instance, using the transparent conductive material, the sensor electrodes may be used for ground, guard, rotation, click, grab, and/or other functionalities.

In some instances, the center area with the transparent conductive material may be used for grounding and/or additional grounding. In such examples, the touch detection may be disabled. In some variations, the center area with the transparent conductive material may be used for additional sensing functions, and firmware may be able to distinguish between the touch detection in the center area versus the applied sensing function (e.g., click, grab, and so on). This will be described in further detail below (e.g., FIGS. 19 and 20 below).

As will be described in further detail below, the present disclosure provides a sensing system, including a knob interface. For example, the sensing system may include a processing system that drives a first subset of sensor electrodes with a sensing signal and receives corresponding resulting signals. The processing system also drives a second subset of the sensor electrodes with a reference signal and a third subset of the sensor electrodes with a guard signal. The sensing electrodes may be made of and/or electrically connected to transparent conductive material. The transparent conductive material (e.g., a transparent conductive electrode) may be made of and/or include ITO, metal-mesh, or another type of conductive material that enables an amount of light to pass through such as allowing at least a portion of light (e.g., a minimum amount of light) to pass through. For example, in some instances, the knob interface may display information in the center area. By using the transparent conductive material/the transparent conductive electrodes, the center area may be used to still display information while also include sensor electrodes that are used for one or more functionalities (e.g., click, grab, ground, guard, and/or other functionalities).

In some variations, the transparent conductive material (e.g., a transparent conductive film) may be placed, used, positioned over the visible center of the knob hole to capacitively couple the amplifier (AMP) signal (e.g., sensing, ground, guard) waveforms to the rest of the knob system. In addition to the visible center knob hole, in some examples, the transparent conductive film may also be used where the knob base covers the display. In some variations, the benefit of increased conductive regions over the AMP touch pixels in the center region enables increased grounding and added sensing signals to incorporate more knob features. This may be especially beneficial when knob sizes are smaller or have reduced dimensions (e.g., a smaller radius and/or diameter). Example knob interfaces are described in U.S. Pat. No. 10,921,913, titled "Rotatable knob interface," U.S. Pat. No. 11,256,376, titled "Rotatable knob interface," and U.S. patent application Ser. No. 17/821,866, filed on Aug. 24, 2022 and titled "Capacitive knob sensing system and method to detect initial states," which are incorporated by reference in their entirety herein.

FIG. 1 is a block diagram depicting an electronic device (e.g., an input device) according to one or more examples of the present disclosure. The electronic device 100 may be configured to provide input to an electronic system, and/or to update one or more devices. As used herein, the term "electronic system" (or "electronic device" or "input device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional examples of electronic systems include composite input devices, such as physical keyboards that include the electronic device 100 and separate joysticks or key switches. Further examples of electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device. In other embodiments, the electronics system may be part of an automobile, and the electronic device 100 represents one or more sensing devices of the automobile. In some instances, an automobile may include multiple electronic devices 100, where each electronic device 100 may be configured differently from the other electronic devices.

The electronic device 100 may be implemented as a physical part of the electronic system, or may be physically separate from the electronic system. As appropriate, the electronic device 100 may communicate with parts of the electronic system using any one or more of the following: buses, networks, and other wired or wireless interconnections. Example communication protocols include Inter-Integrated Circuit (VC), Serial Peripheral Interface (SPI), Personal System/2 (PS/2), Universal Serial Bus (USB), Bluetooth®, Radio Frequency (RF), and Infrared Data Association (IrDA) communication protocols.

In some variations, the electronic device 100 may utilize any combination of sensor components and sensing technologies to detect user input. For example, as show in FIG. 1, the electronic device 100 includes one or more electrodes 125 that may be driven to detect objects or update one or more devices. In some instances, the electrodes 125 are sensor electrodes of a capacitive sensing device. In such instances, the electrodes 125 include one or more common voltage electrodes. In other instances, the electrodes 125 are electrodes of an image sensing device, radar sensing device, and/or ultrasonic sensing device. Further yet, the electrodes 125 may be display electrodes of a display device. For example, the electronic device 100 may include the display panel 120, and the sensor electrodes 125 may comprise display electrodes of the display panel 120. For example, the sensor electrodes 125 are comprised of the common voltage electrodes, data lines, or gate lines of the display panel 120. The sensor electrodes 125 may be operated for input sensing and for updating the display of the display panel 120. For example, the sensor electrodes 125 function as the reference voltage electrode of the display panel 120.

In some examples, the electrodes 125 of the electronic device 100 are comprised of the common electrodes and have a common shape. Some of the examples described herein include a matrix sensor input device. For instance, as is illustrated in FIG. 1, the sensor electrodes 125 are disposed in a two dimensional array of rows and columns. As described in detail below, electronic device 100 may be provided with a rotatable knob interface 150, which may interact with some or all of electrodes 125.

The sensor electrodes 125 may have any shape, size and/or orientation. For example, the sensor electrodes 125 may be arranged in a two-dimensional array as illustrated in FIG. 1. Each of the sensor electrodes 125 may be substantially rectangular in shape. In other examples, the sensor electrodes 125 may have other shapes. Further, each of the sensor electrodes 125 may have the same shape and/or size. In other examples, at least one sensor electrode may have a different shape and/or size than another sensor electrode. In some variations, the sensor electrodes 125 may be diamond shaped, have interdigitated fingers to increase field coupling, and/or have floating cut-outs inside to reduce stray capacitance to nearby electrical conductors. In yet other examples, the orientation of the sensor electrodes 125 may differ from that illustrated in FIG. 1.

In some variations, the sensor electrodes 125 may be disposed in a common layer. For example, the sensor electrodes 125 are disposed on a common side of a substrate. The sensor electrodes 125 may be disposed on lens or encapsulation layer of the display panel 120, or a substrate attached to the display panel 120. Additionally, or alternatively, a first one or more of the sensor electrodes 125 is disposed in a first layer and a second one or more of the sensor electrodes 125 is disposed in a second layer. For example, a first one or more of the sensor electrodes 125 is disposed on a first side of a first substrate, and a second one or more of the sensor electrodes 125 is disposed on a second side of the first substrate. Further, a first one or more of the sensor electrodes 125 may be disposed on a first substrate, and a second one or more of the sensor electrodes 125 may be disposed on a second substrate.

In some instances, capacitive implementations may utilize "self-capacitance" (or "absolute capacitance") sensing methods based on changes in the capacitive coupling between sensor electrodes and an input object. In various examples, an input object near the sensor electrodes, such as, for example, finger or stylus 145, alters the electric field near the sensor electrodes 125, thus changing the measured capacitive coupling. In some instances, an absolute capacitance sensing method operates by modulating sensor electrodes with respect to a reference voltage (e.g., system ground), and by detecting the capacitive coupling between the sensor electrodes and input objects.

In some variations, capacitive implementations may utilize "mutual capacitance" (or "transcapacitance") sensing methods based on changes in the capacitive coupling between sensor electrodes. In some instances, an input object near the sensor electrodes alters the electric field between the sensor electrodes, thus changing the measured capacitive coupling. In some examples, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage, or modulated with reference to the transmitter sensor electrodes to facilitate receipt of resulting signals. A resulting signal may comprise effect(s) corresponding to one or more transmitter signals, and/or to one or more sources of environmental interference (e.g., other electromagnetic signals). Sensor electrodes may be dedicated transmitters or receivers, or may be configured to both transmit and receive.

Capacitive sensing devices may be used for detecting input objects in proximity to and/or touching input devices. Additionally, and/or alternatively, capacitive sensing devices may be used to sense features of a fingerprint. Additionally, and/or alternatively, as in the example of FIG. 1, capacitive sensing devices may be provided with a rotatable knob interface that is electrically coupled to the capacitive sensing device, and may be used to sense the rotary position of the rotary knob and/or other inputs associated with the rotatable knob interface (e.g., click or grab). In some examples that include the rotatable knob interface, the rotatable knob interface may have a home position and a compressed position, and the sensing device may also be used to determine when the rotatable knob is in the home position, and when it is in the compressed position, based on a change in capacitive coupling of one or more of electrodes 125.

The electronic device 100 further includes a processing system 110. The processing system 110 is configured to operate hardware of the electronic device 100. The processing system 110 comprises a driver module 140 (e.g., a driver device), which may include a signal generator. In some examples, the driver module 140 generates sensing signals with which to drive electrodes 125. In some instances, the processing system 110 comprises parts of or all of one or more integrated circuits (ICs) and/or other circuitry components.

In some variations, the processing system 110 also comprises electronically-readable instructions, such as firmware code, software code, and/or the like. In some instances, components of the processing system 110 are located together, such as, for example, near sensing element(s) of the electronic device 100. In other instances, components of processing system 110 are physically separate with one or more components in proximity to the sensing element(s) of electronic device 100, and one or more components elsewhere. For example, the electronic device 100 may be a peripheral coupled to a desktop computer, and the processing system 110 may comprise software configured to run on a central processing unit (CPU) of the desktop computer and one or more integrated circuits (ICs) (perhaps with associated firmware) separate from the CPU. As another example, the electronic device 100 may be physically integrated in a phone, and the processing system 110 may comprise circuits and firmware that are part of a main processor of the phone. Further yet, the processing system 110 may be implemented within an automobile, and the processing system 110 may comprise circuits and firmware that are part of one or more of the electronic control units (ECUs) of the automobile. In some examples, the processing system 110 is dedicated to implementing the electronic device 100. In other examples, the processing system 110 also performs other functions, such as operating display screens, driving haptic actuators, and/or performing other functions.

The processing system 110 may be implemented as one or more modules (e.g., devices) that operate different functions of the processing system 110 (e.g., driver module 140, or determination module 141). Each module may comprise circuitry that is a part of the processing system 110, firmware, software, or a combination thereof. In various instances, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes. In some instances, the electronic device 100 may be implemented as a chip, or as one or more chips. In some examples, the electronic device 100 may comprise a controller, or a portion of a controller, of electronic device 100.

In some instances, the processing system 110 includes a driver module 140 (e.g., driver circuitry). The driver module 140 may simultaneously operate two or more of the sensor electrodes 125 for absolute capacitive sensing, such that a different resulting signal is simultaneously received from each of the sensor electrodes or a common resulting signal from two or more sensor electrodes. Additionally, or alternatively, some of the sensor electrodes 125 may be operated for absolute capacitive sensing during a first period and others of the sensor electrodes 125 are operated for absolute capacitive sensing during a second period that is non-overlapping with the first period.

The processing system 110 may further include a determination module 141 (e.g., determination circuitry). The determination module 141 comprises circuitry, firmware, software, or a combination thereof. As will be described in greater detail in the following, the determination module 141 processes the resulting signals received by the sensor driver 140 to determine changes in capacitive couplings of the sensor electrodes 125. For example, the determination module 141 is configured to determine changes in a capacitive coupling between each modulated sensor electrode and an input object, such as input objects 145, from the resulting signals. Different combinations of drivers and modules may be used. For example, the processing system 110 may include one or more drivers that operate hardware such as display screens. Further, the processing system 110 may include data processing modules for processing data such as sensor signals and positional information, and/or reporting modules for reporting information.

The processing system 110 may be implemented as an integrated circuit (IC) chip, or as one or more IC chips. The processing system 110 may comprise a controller, or a portion of a controller, of the electronic device 100. The processing system 110 may include a display driver (e.g., the driver module 140 or a separate device) that is configured for updating a display of the display panel 120. In such an example, the processing system 110 may be referred to as including touch and display driver integration (TDDI) technology. In such instances, the driver module 140 may be implemented as a TDDI chip, or a portion of a TDDI chip. In some examples, the electronic device may include matrix sensor(s) and may also include TDDI technology.

In some variations, the processing system 110 responds to user input (or lack of user input) directly by causing one or more actions. Example actions include changing operation modes, as well as graphic user interface (GUI) actions such as cursor movement, selection, menu navigation, and other functions. In some instances, the processing system 110 provides information about the input (or lack of input) to some part of the electronic system (e.g., to a central processing system of the electronic system that is separate from the processing system 110, if such a separate central processing system exists). In some examples, some part of the electronic system processes information received from the processing system 110 to act on user input, such as to facilitate a full range of actions, including mode changing actions and GUI actions. Further, in some examples, the processing system 110 is configured to identify one or more objects, and the distance to these objects. In some instances, the processing system 110 is configured to identify (determine) one or more rotational changes of knob interface 150, or one or more changes of state of knob interface 150, or both, and map those changes to desired actions. Additionally, and/or alternatively, the processing system 110 is configured to determine additional input from the knob interface 150. For example, as will be described in further detail below, the knob interface 150 may include and/or may be coupled to transparent conductive material. For instance, the transparent conductive material may be positioned or placed within the interior ring of the knob interface 150 (e.g., within the interior of the inner ring 153 shown in FIG. 1). As will be described in further detail below, by using the transparent conductive material, the sensor electrodes 125 that are coupled to the interior ring of the knob interface 150 may be used for one or more functions such as ground, grab, click, and so on.

In some instances, the processing system 110 operates electrodes 125 to produce electrical signals (resulting signals) indicative of input (or lack of input) in a sensing region. The processing system 110 may perform any appropriate amount of processing on the electrical signals in producing the information provided to the electronic system. For example, the processing system 110 may digitize analog electrical signals obtained from the electrodes 125. As another example, the processing system 110 may perform filtering or other signal conditioning, or, as yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, recognize fingerprint information, distance to a target object, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

It should be understood that while many examples of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, and/or alternatively, examples of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

In some instances, the processing system 110 is configured to generate a voltage signal to drive the electrodes 125 during a display update interval and an input sensing interval, respectively. In such instances, the voltage signal generated to drive the electrodes 125 during a display update interval is a substantially constant, or fixed voltage, and the voltage signal generated to drive the electrodes 125 during an input sensing interval may be referred to as a sensing signal, having a waveform with a periodically variable voltage. In some examples, the value of a voltage signal to drive the electrodes 125 during a display update interval may be predetermined. For example, the voltage value may be provided by a manufacturer of electronic device 100 and/or the electrodes 125, and may be device-specific to electronic device 100. The processing system 110 may comprise circuitry to generate the voltage signal based on a clock signal, the output of the oscillator and/or the corresponding value of the voltage signal.

For example, in some instances, the driver module 140 comprises circuitry configured to provide the sensing signal. For instance, the driver module circuitry may include an oscillator, one or more current conveyers and/or a digital signal generator circuit. In some examples, the circuitry of the driver module 140 generates the voltage signal based on a clock signal, the output of the oscillator and the parameters discussed above.

As noted above, in some instances, the driver module 140 generates a signal to drive the electrodes 125 during each of the display update periods and input sensing update periods. In such instances, an input sensing update period is provided in between two display update periods, and is of a shorter duration than a display update period. In such instances, there are several display update periods and input sensing update periods per display frame. In some examples, by acquiring the resulting signals over successive input sensing periods, the rotation of the rotatable knob interface 150, as well as whether it is in its home state or compressed state, may be tracked.

The display of the display panel 120 is updated during display frames. During each display frame, one or more display lines of the display may be updated. Multiple display update periods and non-display update periods may occur during each display frame of a plurality of display frames. During a display update period, one or more of the display electrodes of the display panel 120 may be driven to update the display of the display panel 120. During non-display update periods, one or more of the display electrodes of the display panel 120 may not be driven to update the display of the display panel 120. The non-display update periods may occur between pairs of display update periods of a display frame, at the start of a display frame, and/or at the end of a display frame.

The display panel 120 includes one or more display lines. Each display line corresponds to one or more subsets of the subpixels of the display panel 120. The one or more subsets may be connected to a common gate line of the display panel 120. Further, the subpixels may be updated during a common period. During each display update period, one or more display lines of the display panel 120 may be updated. The display frames may occur at a display frame rate. The display frame rate may be 30 Hz, 60 Hz, 120 Hz, or 240 Hz, among others. The sensor driver 140 or another driver of the processing system 110 may drive the display electrodes of the display panel 120 to update the display of the display panel.

The driver module 140 operates the sensor electrodes 125 for capacitive sensing during input sensing periods. The input sensing periods may occur during non-display update periods and/or display update periods. For example, one or more of the input sensing periods is provided during a non-display update period that occurs between two display update periods of a display frame. In some instances, at least one input sensing period is as long as a display update period. In other instances, at least one input sensing period is longer than a display update period. In yet other instances, at least one input sensing period is the same as a display update period. Acquiring the resulting signals over successive input sensing periods allows the rotation of the rotatable knob interface 150, as well as whether the rotatable knob interface 150 is in the home state or the compressed state, to be tracked.

As noted above, in some variations, an additional input apparatus may be provided on top of the display panel 120 of the electronic device 100, such as, for example, the rotatable knob interface 150, and may be electrically coupled to some or all of electrodes 125 that are positioned near or below it. In some instances, the additional apparatus may provide alternate ways for a user to provide input to electronic device 100 other than touching, or hovering near, a display screen with a finger or stylus 145. In the depicted example of FIG. 1, the rotatable knob interface 150 is mounted onto the display panel 120, and may have a full (as shown in FIG. 1) or partial overlap with the display panel 120. As noted, in one or more examples, the rotatable knob interface 150 may have a stationary base that is provided with various sets of coupling electrodes configured to couple with respective sets of electrodes of the display panel 120, such as one or more sets of electrodes that are provided with sensing signals and one or more sets of electrodes that are provided with reference signals. In some variations, the stationary base may include different conductive regions respectively connected to corresponding sets of coupling electrodes. For instance, the stationary base may include or may be coupled to a transparent conductive material.

In some instances, the rotatable knob interface 150 also includes a rotary wheel that sits above, and rotates relative to, the stationary base. In such instances, an underside of the rotary wheel is patterned with various conductive and non-conductive regions in a peripheral region 152, configured to align with the conductive regions of the stationary base so that there are various electrical couplings between the conductive regions of the stationary base and the various conductive and non-conductive regions in the peripheral region 152 of the rotary wheel. These components are further configured such that these electrical couplings change as the rotary wheel is rotated, in such manner that by detecting the effects of the changes in the electrical couplings on resulting signals received on the display panel, the electronic device 100 (e.g., the input device) may determine a rotation, or a change in rotation, of the knob interface 150. In some instances, the patterned region 152 may have numerous possible example arrangements of the conductive and non-conductive regions, and there may be various ways of having the rotary wheel and the stationary base electrically interact as the rotary wheel is rotated. Thus, alternate configurations and relative arrangements of both the conductive regions of the stationary base, and the placement of the conductive and non-conductive regions of the rotary wheel are possible, all being within the scope of this disclosure.

In some examples, the rotation imparted to the rotatable knob interface by a user, in either relative or absolute terms, may be detected by the electronic device 100. In some instances, the rotatable knob interface 150 may also be pressed downwards by a user, and may thus have two positions: a home or "uncompressed" position, and a "compressed" position, which a user maintains by, for example, pushing down on the knob interface 150 against one or more biasing springs. In some instances, the rotatable knob interface 150 has a cover. In some variations, the rotatable knob interface may be pressed downwards so as to rest at multiple positions, and thus may have multiple states between an "uncompressed" and a "fully compressed" position. In the home position, the cover is at a greater distance above the rotary wheel than in the compressed position. In some variations, the rotary wheel may have several switches provided between the rotary wheel and the cover, and these switches may include biasing springs. In such variations, the rotatable knob interface 150 may be provided with a fourth set of coupling electrodes, which couple to electrodes of the input device that are also driven with sensing signals. In the example of FIG. 1, the fourth set of coupling electrodes is connected to an inner ring provided in the stationary base, which aligns with a similarly shaped inner ring 153 that is provided in the rotary wheel. In such examples, when a user presses down on the cover of the rotatable knob interface, so that the rotatable knob interface 150 is then in the "compressed" position, the switches close so as to connect the inner ring 153 of the rotary wheel with all of the conductive regions provided in patterned region 152. This serves to electrically couple the fourth set of coupling electrodes of the stationary base to the first set of coupling electrodes of the stationary base, thereby coupling a corresponding fourth set of electrodes of the display panel to a reference signal. However, when the user ceases to press down on the cover, the fourth set of coupling electrodes of the knob interface simply floats. In some instances, the direction and degree of rotation, as well as a user pressing down on, or ceasing to press down upon, the rotatable knob interface 150, may be interpreted by processing system 110, such as, for example, by the determination module 141, and may be mapped to various user input actions, signals, or directives.

In some instances, a user may rotate the rotatable knob interface 150 in various ways, for example, grabbing an outer housing of the rotatable knob interface and turning it, grabbing a top of the rotatable knob interface, or a flange protruding from the side of the rotatable knob interface and turning it, or placing one or more fingertips in or on a recessed channel on an upper surface of the rotatable knob interface.

In some instances, the electronic device 100 of FIG. 1 may be provided in an automobile. For example, the electronic device 100 may be affixed to a substantially vertical display screen provided in a central part of a dashboard. In some variations, all the electrodes not physically blocked by the rotatable knob interface 150, whether the electrodes 125 are inside or are outside of region 155 (described below), remain active. Thus, in such variations, both touches away from the knob, and rotations of the knob, are detected and reported by the electrodes 125 at the same time.

In some examples, all other forms of user input besides those received via the rotatable knob interface 150 may be disabled on the electronic device. Thus, in such examples, the electrodes 125 are not driven during the sensing interval to perform their standard sensing functionality. As a result, if a finger or other object 145 is moved into, or away from, its vicinity, no resulting signal is obtained, or if obtained, it is not processed. In such examples, this may be done to prevent a driver of the automobile from attempting to touch the display 120 while driving, as a safety measure, and thus to only interact with the electronic device 100 via the rotatable knob interface 150. In such examples, the disabling of standard sensing functionality of the electrodes 125 may be implemented during specified activities of the automobile, but not during others. For example, the disabling of standard sensing functionality of the electrodes 125 may be implemented while the automobile is in actual motion, but at all other times some of the electrodes 125, for example, those not near enough to the rotatable knob interface to interfere with signals acquired from it, may be operated to perform standard sensing, as described above.

In some instances, when all of the electrodes 125 are disabled from standard sensing, whether during actual driving of the automobile, or whether at all times, as the case may be, the only way that a driver of the automobile can provide input to the electronic device 100 is via the rotatable knob interface 150, using a pre-defined set of rotations and/or pressings of the rotatable knob interface 150. These motions modify a resulting signal which is received by the electronic device 100 during a sensing period, which then interprets them, for example, using determination module 141. The resulting signal may be the same signal as the sensing signal that driver module 140 drives an electrode 125 with, after being modified by the capacitive coupling of the rotary knob interface 150.

In some instances, for example, only some of the electrodes 125, in particular those that are near or beneath the rotary knob interface 150, are disabled from standard capacitive sensing, and the remainder of the electrodes 125 on the electronic device 100 may still be operative for standard capacitive sensing. In such instances, the electrodes that are disabled for standard capacitive sensing are those that are close enough to the rotatable knob interface 150 such that driving them with standard sensing signals may interfere with the resulting signals obtained from various sets of the electrodes 125 that are respectively electrically coupled to the coupling electrodes of the rotatable knob interface 150. To illustrate this feature, in FIG. 1, there is shown a dashed line boundary 155. Electrodes 125 within the boundary 155 are in a "blackout zone" and not driven with a standard sensing signal. Rather, as described in detail below, any of the electrodes within the blackout zone that are electrically coupled to the rotatable knob interface are driven so as to capture rotations and compressions of the rotatable knob interface, as described below.

In general, within the blackout zone, a first, second and third set of the electrodes 125 are coupled to corresponding first, second and third sets of the coupling electrodes of the stationary base of the rotatable knob interface 150. In some instances, the first set are driven with a reference signal, and the second and third sets are driven with a sensing signal to obtain a resulting signal modified by the then extant relative rotational relationship of the stationary base and the rotary wheel of the rotatable knob interface 150. Thus, in each of these instances, the electrodes within the blackout zone boundary 155 may be disabled from standard capacitive sensing at all times.

Furthermore, as noted above, sets of electrodes of the electronic device 100 (e.g., grid electrodes) are electrically coupled to corresponding sets of coupling electrodes of the rotatable knob interface 150 (e.g., knob interface electrodes). Thus, during an input sensing period, a reference signal is supplied by the driver module 140 to a first set of the electrodes 125, and a sensing signal is supplied to second and third sets of the electrodes 125. In some instances, the reference signal may be a configurable direct current (DC) output provided by the processing system 110. In some examples, the DC signal may be a ground signal of the electronic device 100. In some variations, a resulting signal is obtained from each of the second and third sets of the electrodes 125, where the resulting signals is the sensing signal as modified by the rotational state of the rotatable knob interface 150. The resulting signals are interpreted by the determination module 141 to determine a rotation of the rotatable knob interface 150. For instance, using the resulting signals, the processing system 110 may determine a number of states (e.g., detents or resolutions) that the user has rotated the rotatable knob interface 150 as well as the direction of the rotation. The rotation may be determined in relative terms, such as a differential angular change from a prior position, or in absolute terms, such as a positive or negative angular change from a home position. In examples where the rotatable knob is turned more than 360 degrees, the overall rotational distance may be measured. One or more user commands may be mapped to absolute rotational distance. The user commands may correspond to controlling a graphical user interface (GUI) of an input device. For example, the user commands may include scrolling through a list of menu items presented on by the GUI. In alternate embodiments, only the one or both of overall angular change between starting position and ending position, or final absolute angular position, is measured. For example, the determination module 141 determines a final absolute angular position which may be related to a menu item presented by a GUI of an input device.

Figure 2:
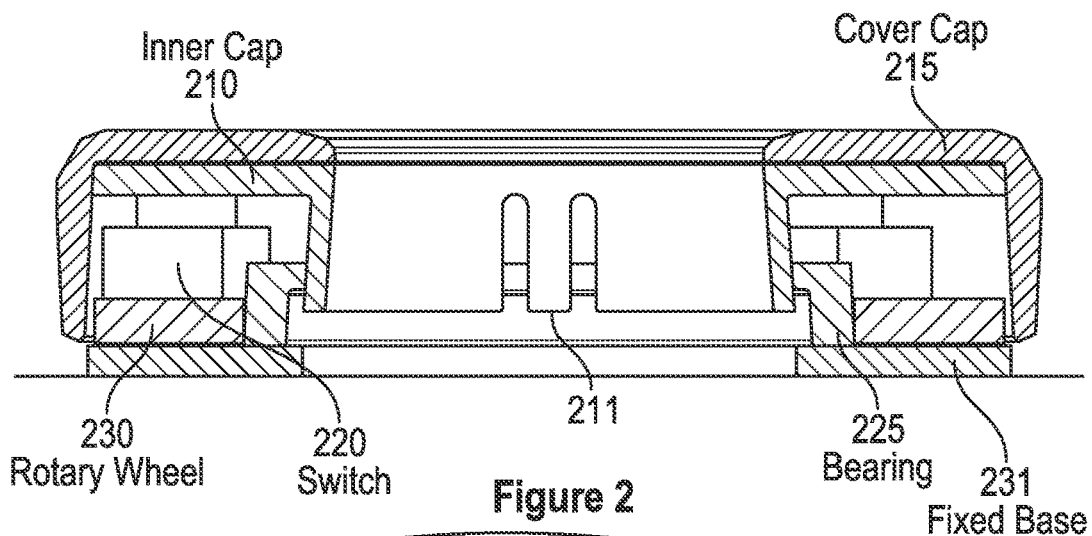
FIG. 2 illustrates a cross-sectional side view of an example rotatable knob interface according to one or more examples of the present disclosure.

FIG. 2 illustrates a cross-sectional side view of an example rotatable knob interface (e.g., the rotatable knob interface 150 shown in FIG. 1) according to one or more examples of the present disclosure. For instance, starting at the bottom, the rotatable knob interface includes a fixed base 231. In some instances, the fixed base 231 does not move as a user rotates the example knob interface. Thus, in some examples, the fixed base 231 is affixed to the surface of an example input device, such as, for example, by an adhesive. The fixed base 231 may be affixed to a surface (e.g., a lens or encapsulation layer of the display panel 120 of the input device 100). In some variations, the fixed base 231 is affixed to the input device in a semi-permanent or permanent manner, and is placed thereon so as to align with a grid of electrodes provided in the input device 100.

In some instances, a transparent conductive material (e.g., metal-mesh or indium tin oxide (ITO)) and/or one or more additional layers may be placed below and/or next to the fixed base 231 (e.g., between the fixed base 231 and the cover glass of the display panel 120, which is shown and described in FIGS. 14 and 21-23 below). For example, the knob interface 150 may include one or more layers between the fixed base 231 and the display panel 120. As shown, the fixed base 231 includes the two dashed sections on the left and right sides of the knob interface 150 (e.g., the exterior sides). The transparent conductive material may be placed below the entire fixed base 231, one or more portions of the fixed base 231, and/or within the interior of the fixed base 231 (e.g., within the center portion or area of the fixed base 231). For instance, in some variations, the transparent conductive material may be placed or positioned below the center region that is within the fixed base 231 (e.g., between the two dashed sections on either end of the fixed base that is below the rotary wheel 230). In other variations, the transparent conductive material may be placed below the center region of the fixed base 231 as well as below the fixed base 231 itself (e.g., below the dashed portions of the fixed base 231). Additionally, and/or alternatively, the transparent conductive material may further be placed below the dashed sections of the fixed base 231 (e.g., the sections below the rotary wheel 230). The transparent conductive material may provide electrical conductivity to the sensor electrodes 125 that are coupled to the transparent conductive material such that the sensor electrodes 125 are configured to provide one or more functionalities. For example, without the transparent conductive material, a non-conductive material (e.g., the center region within the interior of the fixed base 231) may be coupled to one or more sensor electrodes 125, and based on the coupling of the non-conductive material, the sensor electrodes 125 may be unable to provide meaningful signals to the processing system 110 (e.g., might not be able to complete an electrical circuit). By using the transparent conductive material, the sensor electrodes 125 may provide meaningful signals to the processing system 110 such as indicating user input (e.g., providing "0" or "1" binary signals in response to user input and/or a value or magnitude based on the user input). For example, by including the transparent conductive material within the interior of the fixed base 231, the sensor electrodes 125 of the input device that are within the center portion of the fixed base 231 may be used for one or more functions such as detecting user input, receiving driving signals from the processing system 110, provide resulting signals to the processing system 110, used for ground or guard signals, and/or perform other functionalities. In some instances, the fixed base 231 may include the transparent conductive material and/or one or more additional layers. For instance, the fixed base 231 may extend the entire width of the knob interface 150 (e.g., the two dashed sections described above as well as the interior section). The transparent conductive material may be placed or positioned in or below the interior section and/or in or below the two dashed sections. Additionally, and/or alternatively, the knob interface 150 may include one or more additional sections or layers (e.g., a transparent film layer, a cover glass, an optically clear adhesive layer, a protective film layer, and/or additional or alternative layers). For instance, the transparent conductive material and one or more additional layers of material may be between the fixed base 231 and the display panel 120. This will be explained in further detail below.

Figure 3:
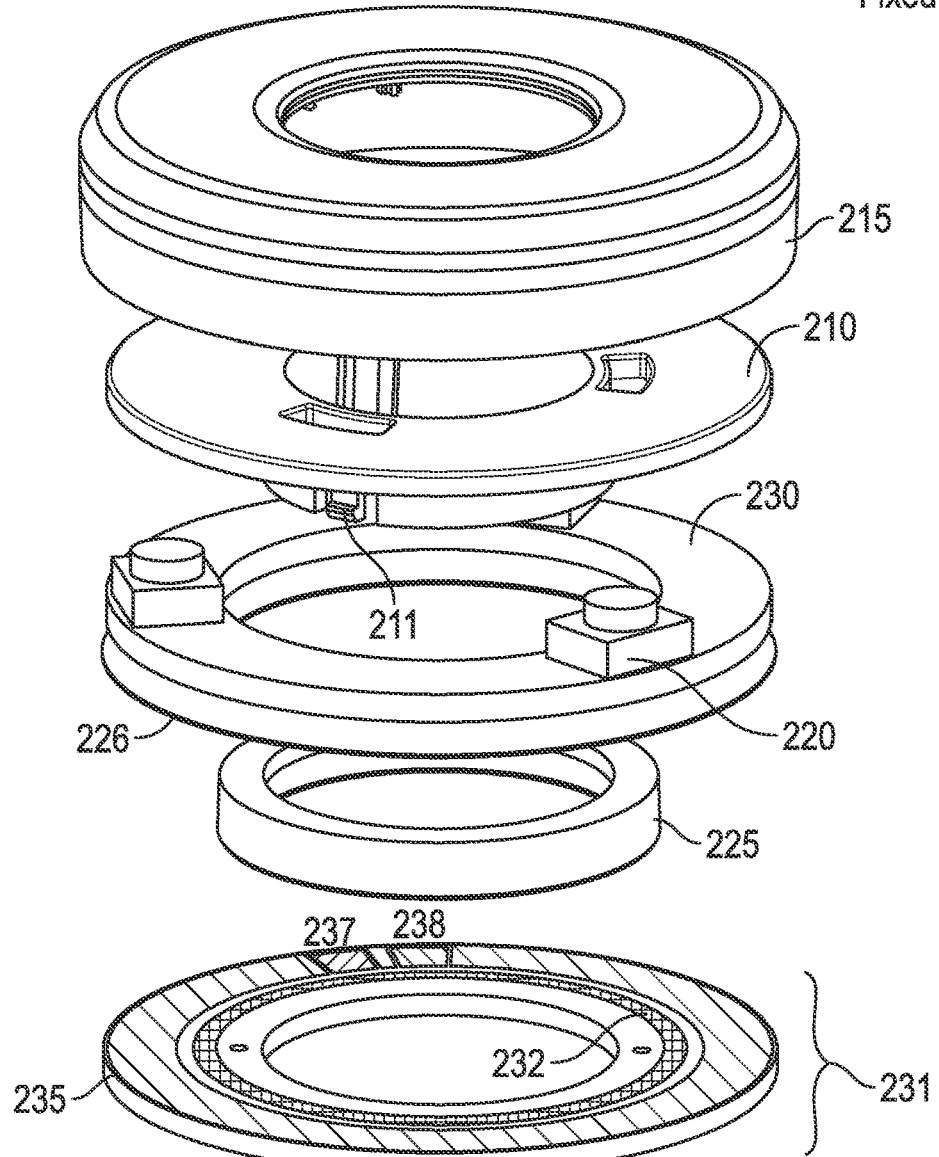
FIG. 3 illustrates an exploded view of the example rotatable knob interface of FIG. 2 according to one or more examples of the present disclosure.

Provided above the fixed base 231 is a rotary wheel 230. The rotary wheel 230 turns as a user rotates the knob interface, such as, for example, by grasping and turning cover cap 215, as described below. At an inner side of the rotary wheel 230 is provided a vertical ring bearing 225. The vertical ring bearing 225 is non-conductive, and may be made of plastic, for example, and may have the shape of a ring. Vertical ring bearing 225 may have a substantially tubular shape. Not shown in FIG. 2, but described below with reference to FIG. 3, is an additional substantially horizontal ring-shaped bearing upon which the rotary wheel 230 sits according to one or more examples of the present disclosure. By using both of the bearings, frictional forces between the fixed base 231, and the rotary wheel 230 may be reduced.

Continuing with reference to FIG. 2, provided on top of rotary wheel 230 are one or more switches 220. For example, switches 220 may be dome switches, capacitive switches, or the like. There may be three switches 220, and the switches may be equidistantly placed on an upper surface of rotary wheel 230. In other examples, less than or more than three switches may be utilized. As described more fully below, the switches 220 are used to distinguish between two states of the rotatable knob interface 150, namely a compressed state, in which the switches 220 are closed, and an uncompressed state, in which the switches 220 remain open. In other instances, the switches 220 may be used to distinguish more than two states of rotatable knob interface 150. For example, the switches 220 may be used to distinguish a compressed, uncompressed state, and one or more partially compressed states. In such instances, in the partially compressed states, the switches 220 are neither opened nor fully closed. Partially compressed, compressed, and open states may be determined based on corresponding measured changes in capacitive coupling caused by movement of a coupling electrode. In some variations, an open state may correspond to a measured change in capacitive coupling that corresponds to a lowest value, a closed state may correspond to a measured change in capacitive coupling that corresponds to a highest value, and a partially compressed state correspond to a measured change in capacitive coupling that corresponds to a value between the lowest value and the highest value. Multiple partially compressed states may be utilized. Each partially compressed state corresponds to a different measured change in capacitive coupling. In some variations, the determination module 141 compares the measured change in capacitive coupling to each of the values to determine the state of the rotatable knob interface 150. The compression state of the rotatable knob interface 150 is orthogonal to its internal rotational position. Thus, the rotatable knob interface 150 may be rotated while in either a compressed, a partially compressed, an uncompressed state (and in any position in between the states of the rotatable knob interface 150), and that rotation may be sensed and measured. Similarly, the state of the switches 220 corresponding respectively to the rotatable knob interface 150 being in the "home" or uncompressed state, in the compressed state, or in a partially compressed state, may be detected whether or not the rotatable knob interface 150 is rotationally stationary or being rotated.

Furthermore, the knob interface has an inner cap 210 and a cover cap 215. In operation, a user physically interacts with cover cap 215, for example, by grasping cover cap 215 and rotating the rotary wheel 230 relative to the fixed base 231, or by pushing down on cover cap 215 to compress the knob interface and close the switches 220. As shown, the inner cap 210 is attached, by prongs 211, to a lip provided on the inner surface of vertical ring bearing 225. The cover cap 215 is attached to the inner cap 210, such that turning the outer cap 215 rotates the rotary wheel 230.

FIG. 3 shows an exploded view of the example rotatable knob interface of FIG. 2, and illustrates the upper side of various components. Beginning at the bottom, FIG. 3 shows the upper surface of the fixed base 231. The upper surface is provided with a conductive peripheral ring 235, to be coupled to a reference signal of an input device to which the rotary knob is to be attached. As shown, the upper surface also shows an inner conducting ring 232 as well as two conductive pads 237 and 238. In some instances, these three conductive regions are configured to be coupled to a sensing signal of the input device. Details of these regions, their functions, and how they interact with the input device upon which the rotary knob sits, are described in greater detail below.

FIG. 3 further shows the vertical ring bearing 225, and a horizontal ring-shaped bearing 226, configured to slide over it. In some instances, because the fixed base 231 has a smaller inner diameter than the rotary wheel 230, there is a ledge at the inner periphery of the fixed base 231 upon which the vertical ring bearing 225 may sit. The vertical ring bearing 225 is thus configured to fit inside the inner diameter of the horizontal ring bearing 226, and rest upon the inner periphery of the fixed base 231. The two bearings thus provide a physical interface between the fixed base 231 and the rotary wheel 230, as noted above, which reduces friction between them as the rotary wheel 230 is moved.

FIG. 3 further shows three switches 220 provided around the upper surface of rotary wheel 230. As noted, these switches may be dome switches, for example. Above the switches 220 is shown the inner cap 210, which is configured to fit inside the vertical ring bearing 225, and be secured to the vertical ring bearing 225 by means of three prongs 211, which, in one or more examples are also placed equidistantly around the inner vertical surface of the vertical ring bearing 225. As shown, the inner cap 210 has a substantially horizontal upper ring, and a lower hollow cylindrical shaped portion. Thus, in some instances, the outer diameter of the lower cylindrical shaped portion of the inner cap 210, is designed to fit within an inner diameter of the vertical ring bearing 225, and then clamp to the bottom surface of the vertical ring bearing 225 by the prongs 211, which slightly protrude under such bottom surface when the inner cap 210 is in the home or uncompressed position. Further, the cover cap 215 is attached to the upper ring portion of the inner cap 210.

Figure 4A:
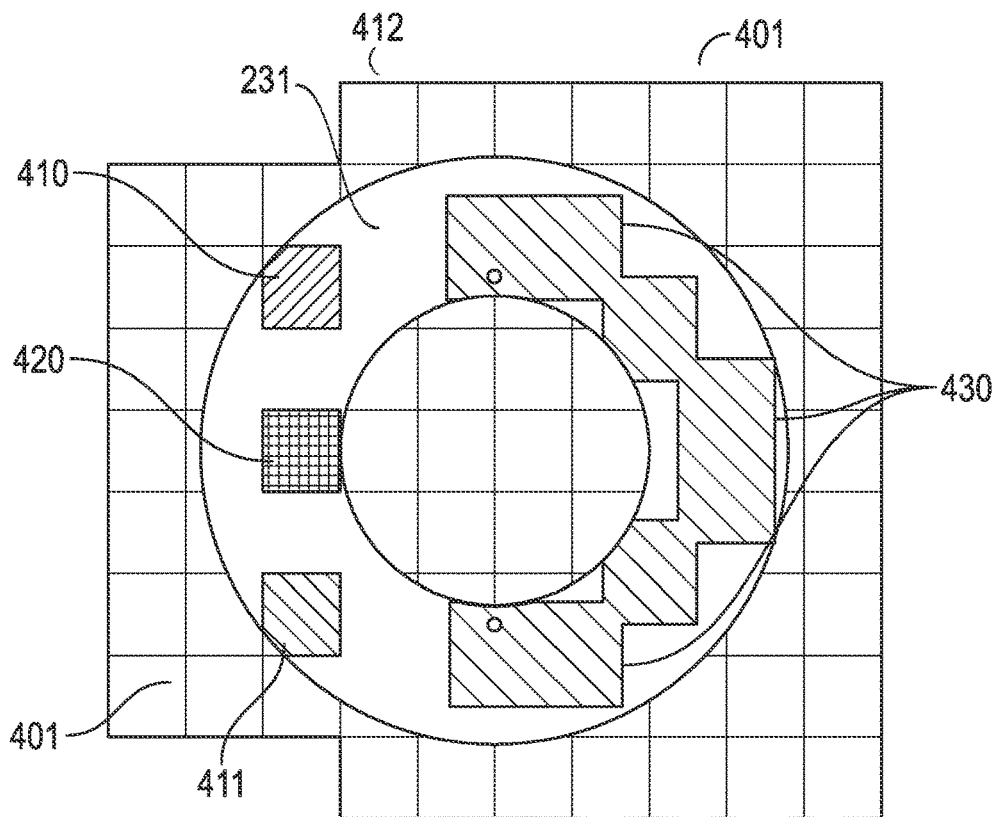
FIG. 4A illustrates an underside view of the fixed base of an example rotatable knob interface as shown in FIG. 3 with a first set of reference electrodes and two sets of sensing electrodes according to one or more examples of the present disclosure.
Figure 4B:
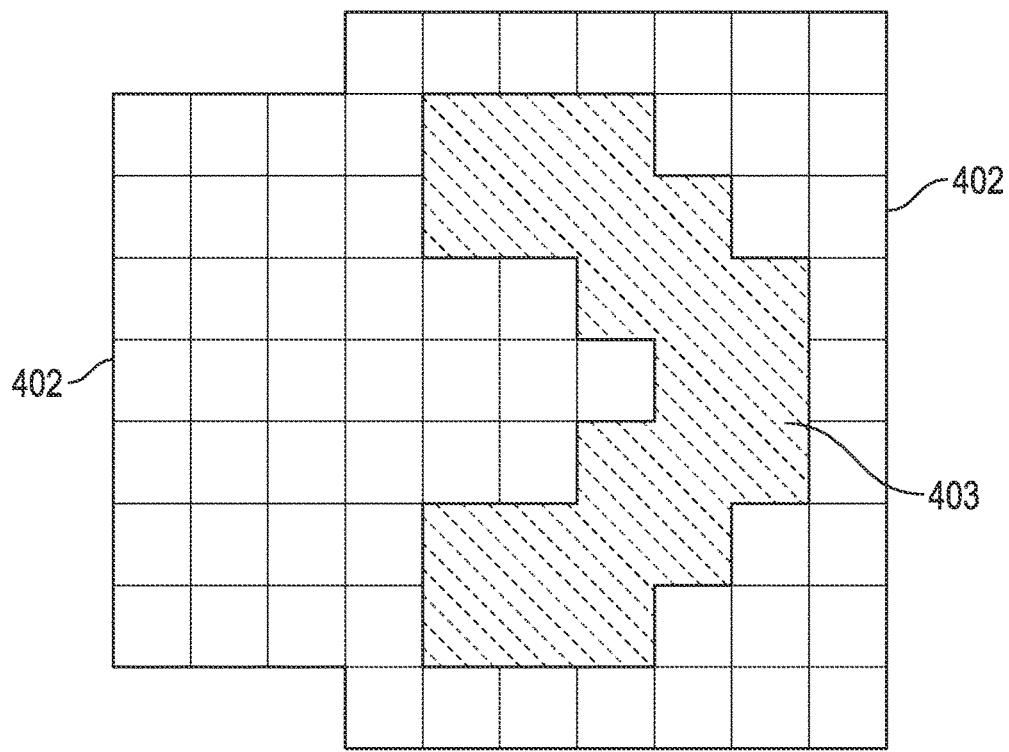
FIG. 4B illustrates an example portion of an input device with an electrode grid with two sets of electrodes according to one or more examples of the present disclosure.
Figure 4C:
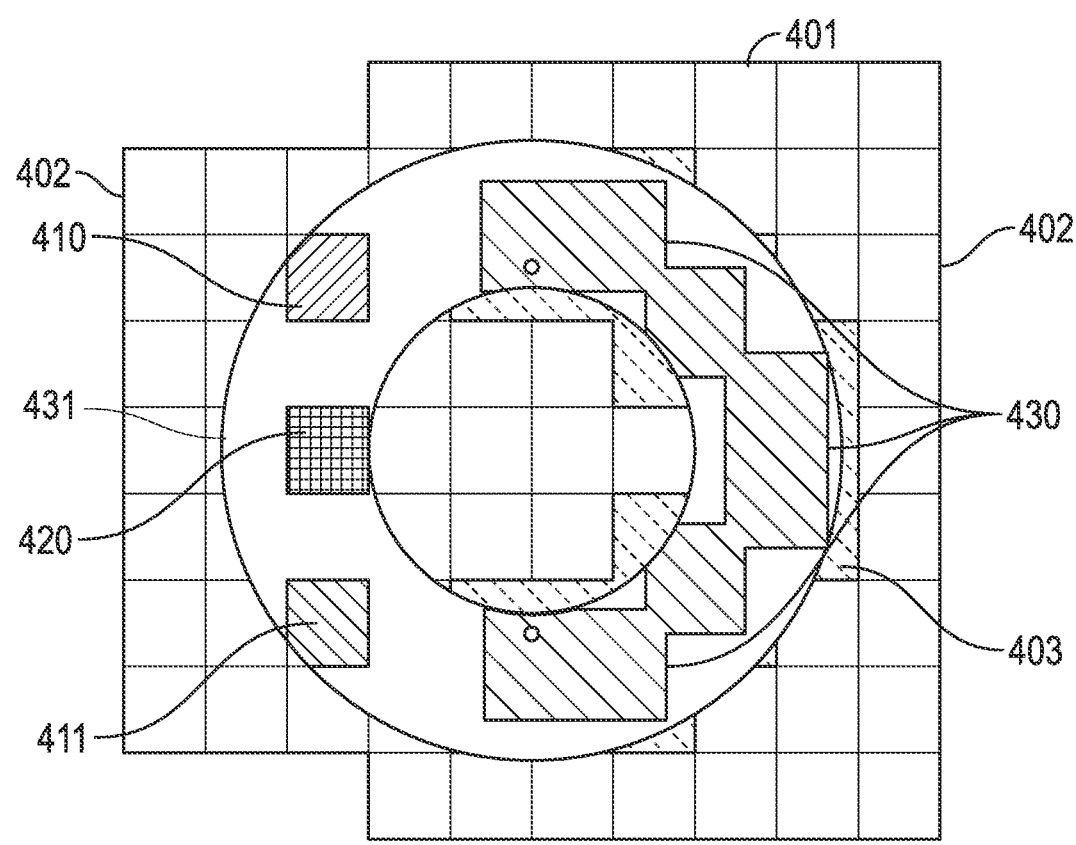
FIG. 4C illustrates the fixed base of an example rotatable knob interface of FIG. 4A as positioned over the example sensor grid of FIG. 4B according to one or more examples of the present disclosure.

FIG. 4A illustrates an underside view of the fixed base of an example rotatable knob interface as shown in FIG. 3 with a first set of reference electrodes and two sets of sensing electrodes according to one or more examples of the present disclosure. FIG. 4B illustrates an example portion of an input device with an electrode grid with two sets of electrodes according to one or more examples of the present disclosure. FIG. 4C illustrates the fixed base of an example rotatable knob interface of FIG. 4A as positioned over the example sensor grid of FIG. 4B according to one or more examples of the present disclosure. For instance, FIGS. 4A-4C illustrate the spatial relationships between coupling electrodes provided on the bottom surface of the fixed base 231, respectively connected to corresponding conducting regions on the top surface of the fixed base 231, and electrodes in a grid provided in an example input device. Further, a first set 430, shown as shaded, is a connected set of electrodes configured to receive a reference signal from the input device. Three electrodes 410, 420, 411, which are grouped into the remaining two sets, are configured to receive sensing waveforms of the input device. The second set, which includes electrodes 410 and 411, is configured to sense rotation of the knob interface and/or determine an initial state of the knob interface. The third set, which includes electrode 420, is configured to sense a "click" or the closing of the switches 220, for example, when a user pushes the knob interface into its compressed state. In some variations, the electrodes 410, 411, and 420 may be used to perform other functionalities. For instance, as mentioned below, based on using the transparent conductive material, additional grid electrodes may be coupled to one or more new electrodes on the fixed base 231. The additional grid electrodes and the new electrodes (e.g., electrode 1914) may be used for one or more functionalities such as click and/or rotation. The electrodes 410, 411, and 420 may be used for other functionalities. In some instances, sensing electrodes 410, 411 and 420 are designed to each overlap with, to the extent possible, a full input device electrode (e.g., a square)

of grid 401. On the other hand, the set of electrodes 430 may be designed to each overlap portions of multiple electrodes of grid 401, but not full electrodes, such that the set of electrodes 430 only picks up the signal from the corresponding reference electrodes 403 (see FIG. 4B) on the grid 401 on the upper surface of the example input device, and do not pick up any parasitic capacitance from neighboring sensing electrodes. This isolation is illustrated in FIG. 4A by two features. First, there is an empty column 412 of sensing pixels to the right of sensing electrodes 410, 411 and 420 that provides a gap between the sensing electrodes 410, 411 and 420, and the set of electrodes 430. Second, the set of electrodes 430 (full line shading) are each recessed inwardly relative to the reference electrodes 403 (shaded with dotted lines) by, for example, 1.5-2 millimeters (mm). This recessing helps the set of electrodes 430 to only pick up the reference electrode signal and much less so of the parasitic coupling of nearby sensing signals on sensing electrodes 402. Further, this feature also helps with tolerance alignment of the example rotatable knob interface to the input device.

FIG. 4B illustrates the example grid 401 of FIG. 4A divided into two types of electrodes, according to one or more embodiments. In general, each electrode of an input device's grid may be selectively chosen to be driven with a sensing waveform or a reference signal, such as, for example, ground, or other reference signal. In some instances, to coordinate its grid with the electrodes of the underside of a fixed base, as shown in FIG. 4A, the input device's grid may be arranged as shown in FIG. 4B. Thus, grid electrodes 403, shaded in FIG. 4B, may be driven by the input device with a reference signal, and grid electrodes 402 may be driven by the input device with a sensing signal. In some examples, when this scheme is implemented, there is a pairing between the underside of the fixed base 231, and the electrodes of grid 401 of an input device. This is illustrated in the superimposed view of FIG. 4C.

FIG. 4C thus illustrates the underside of fixed base 231 of FIG. 4A as positioned over the example input device electrode grid 401 of FIG. 4B according to one or more examples of the present disclosure. As shown, the sensing electrodes 410, 411 and 420, configured for sensing on the knob interface, are each substantially fully aligned with grid electrodes 402, to be driven with sensing waveforms. In some instances, they are driven with the same sensing waveforms. Similarly, the set of electrodes 430, configured for coupling to a reference signal of the input device, are each provided above multiple grid electrodes 403, to be driven with a reference signal by the input device. In some instances, because the fixed base 231 is stationary, and fixed in position relative to the input device, it is first aligned to the electrodes of the input device, as shown, and then, in some examples, permanently attached to a glass surface of the input device.

In some examples, the transparent conductive material and/or one or more additional layers may be positioned in and/or below the interior region (e.g., center area) of the fixed base 231. By using the transparent conductive material, additional sensing electrodes within the grid of electrodes 401 may be used for one or more functionalities (e.g., click functionality or grab functionality). For example, referring to FIG. 4A, the fixed base 231 is shown as a circle with an interior section (e.g., a donut-shaped fixed base 231). Within the interior, there are a plurality of electrodes (e.g., six fully uncovered electrodes and a few additional electrodes that are semi-covered by the fixed base). The transparent conductive material may be positioned within the interior region such that the six fully uncovered electrodes 125 and/or additional electrodes (e.g., the electrodes that are semi-covered by the fixed base 231) can be used for one or more functionalities. For instance, by coupling these interior grid electrodes 402 and 403 (e.g., electrodes within the donut-region) to the transparent conductive material, the interior electrodes 402 and 403 that are positioned within the interior of the fixed base 231 (e.g., within the donut-region) are also capable of performing one or more functionalities. For example, as shown in FIG. 4B, the grid electrodes 403 that are dotted may be extended to cover certain electrodes within the interior of the fixed base 231. For instance, the seven non-shaded electrodes that are between the upper and lower regions of the grid electrodes 403 may also be used to provide functionalities. For example, these non-shaded electrodes may be driven by the input device with a reference signal. Additionally, and/or alternatively, these non-shaded electrodes may be driven by a sensing signal. Without the transparent conductive material that is between these grid electrodes 402, 403 of the input device and the fixed base 231/the knob interface electrodes (e.g., 410, 411, 420, 430), these interior electrodes might not be capable of producing an electrical circuit with the knob interface 150. For example, as will be explained in detail below, the fixed base 231 uses conductive regions 710 (e.g., conductive pads 237 and 238) so as to form a circuit between the electrodes of the input device 100 (e.g., the grid electrodes) and the electrodes of the knob interface 150 (e.g., electrodes 410, 411, 420, and 430). Using the transparent conductive material, additional grid electrodes are able to be used as the transparent conductive material facilitates the electrical connection with the electrodes of the knob interface 150 (e.g., the electrodes 410, 411, 420, 430, and/or additional electrodes that are not shown in FIGS. 4A-4C such as the additional electrode 1914 shown in FIG. 19).

Additionally, and/or alternatively, the transparent conductive material may further extend beyond the interior region and into the fixed base 231. For instance, the fixed base 231 may include an interior diameter indicating the donut-shaped hole and an exterior diameter. The transparent conductive material may extend beyond the interior diameter to cover the entire area of the fixed base 231 and/or a portion of the fixed base 231 (e.g., an area between the interior and exterior diameters of the fixed base 231). For instance, the transparent conductive material may replace certain conductive regions within or coupled to the fixed base 231. For example, as will be explained below, the conductive regions (e.g., conductive regions 710) may be made of known conductors such as copper or silver. In some variations, the conductive regions described below may be replaced with a transparent conductive material/a transparent conductive layer that operates similarly to the conductive regions 710 described below. By using the transparent conductive material, additional grid electrodes may be used as reference or sensing electrodes (e.g., may be driven with reference or sensing signals). For example, in some instances, the knob interface 150 may decrease in size (e.g., the interior and exterior diameters of the fixed base 231 may decrease). Because of the decrease, which may be due to manufacturing or design considerations, fewer grid electrodes are able to be used if only the electrodes positioned solely below the fixed base 231 (e.g., between the interior and exterior diameters) are used. Accordingly, by using the transparent conductive material, additional grid electrodes may also be used (e.g., the electrodes within the interior of the fixed base 231).

Figure 5:
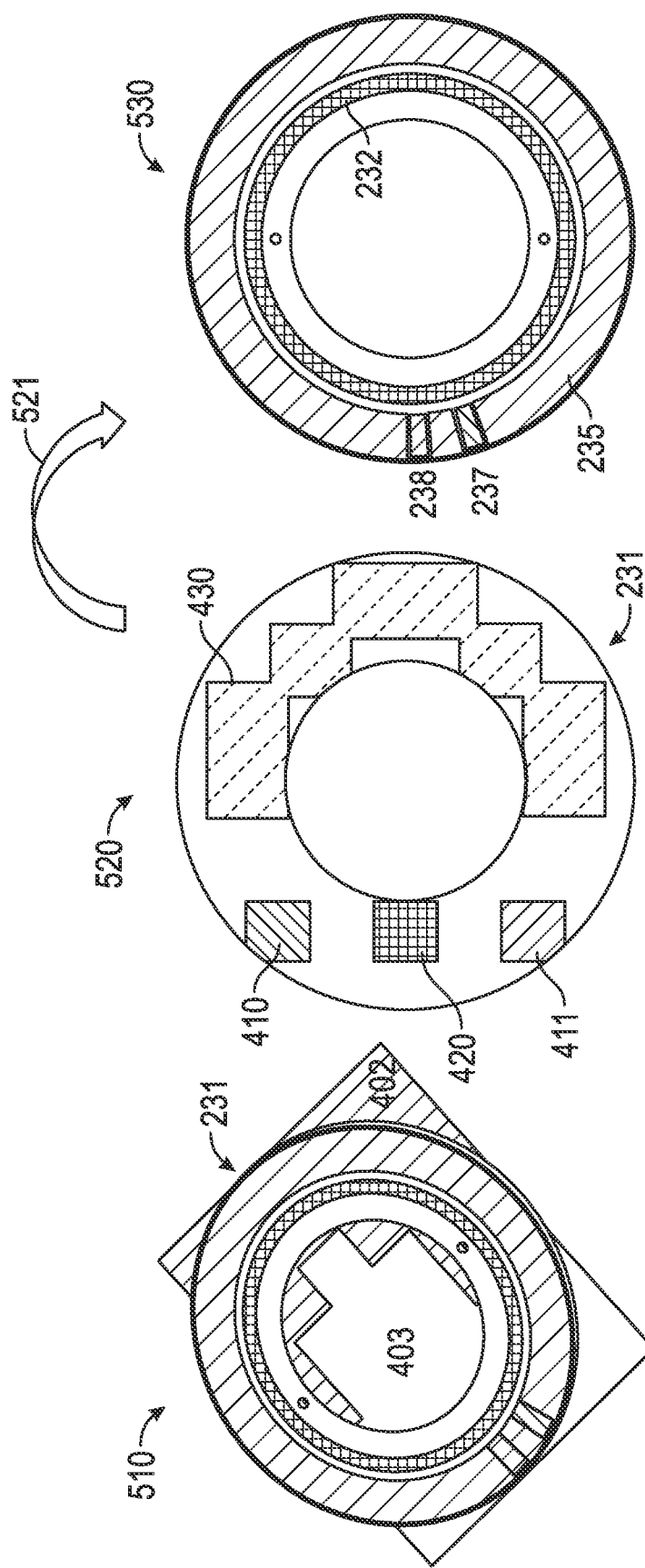
FIG. 5 illustrates a perspective top view, a bottom view, and another top view of the example fixed base of FIGS. 3 and 4A through 4C according to one or more examples of the present disclosure.

FIG. 5 shows the upper surface of the fixed base according to one or more examples of the present disclosure. For instance, the top perspective view 510 illustrates the positions of input device electrode regions 402 and 403 relative to the top surface of fixed base 231. As shown in the top perspective view 510, as well as by comparing bottom surface view 520 with another top view 530, the top surface of fixed base 231 is somewhat differently organized than its bottom surface. To fully appreciate the relative positions of conductive pads on the top and bottom surfaces, bottom surface view 520 is also shown, and, as indicated by the curved arrow 521, a corresponding position of the top surface is also shown by the top view 530. This top view 530 is what would be seen if the fixed base 231 as shown in bottom surface view 520 was flipped about a horizontal axis (such that right and left sides of the fixed base 231 are the same in views 520 and 530, respectively).

The top view 530 illustrates four conductive regions, namely the inner ring 232 (used to sense whether the switches are open or closed), the two conductive pads 237 and 238 (used to sense rotation) and peripheral ring 235. In some instances, each of these is electrically connected to a corresponding conductive region on the bottom surface of fixed base 231. For instance, peripheral ring 235 is electrically connected to a corresponding set of electrodes 430, as noted above, to couple to input device electrodes driven with a reference signal; the two conductive pads 237 and 238 are respectively connected to sensing electrodes 410 and 411; and inner ring 232, is electrically connected to sensing electrode 420. In some examples, as noted above, both conductive pads 237 and 238, as well as inner ring 232 are configured to couple to input device electrodes that are driven with a sensing signal. Additionally, and/or alternatively, the transparent conductive material may be used to facilitate the connection between the input device electrodes and the conductive pads and/or conductive regions on the fixed base 231 so as to provide additional input device electrodes that can be used for performing the functionalities described herein.

Thus, as shown, the top of fixed base 231 has, on its outer periphery, two small conductive pads 237 and 238 near each other, surrounded by a peripheral ring 235. The peripheral ring 235 receives a reference signal, and the two pads 237 and 238 each receive a sensing signal. The two pads are used to sense rotation. A second, thinner ring 232 inside of the peripheral ring 235 is configured to also receive a sensing signal to sense whether the switches are closed. The closing of the switches may also be referred to as a "click" from the sound they make when they close.

FIG. 6A illustrates an exploded view 601 and a collapsed view 603 of the example fixed base 231, the example vertical ring bearing 225, and the horizontal ring bearing 226 (e.g., plastic bearing) shown in FIG. 3. As is shown in the collapsed view 603, the horizontal ring bearing 226 has a smooth surface on top of which the rotary wheel 230 can rest, and the vertical ring bearing 225 has a smooth outer cylindrical structure around which the rotary wheel 230 can turn.

FIG. 6B illustrates the respective exploded view 610 and collapsed view 603 of the example fixed base 231 and the bearings 225, 226 shown in FIG. 6A, with the addition of the example rotary wheel 230 of FIG. 3 provided on top of an example flat ring-shaped bearing 226. As shown, the vertical ring bearing 225 has a larger height than that of the rotary wheel 230, such that it protrudes above the rotary wheel 230. Visible in each of exploded view 610 and collapsed view 603, are the three sets of pads 221 provided on a top surface of the rotary wheel 230 for connection to the set of switches.

Figure 7A:
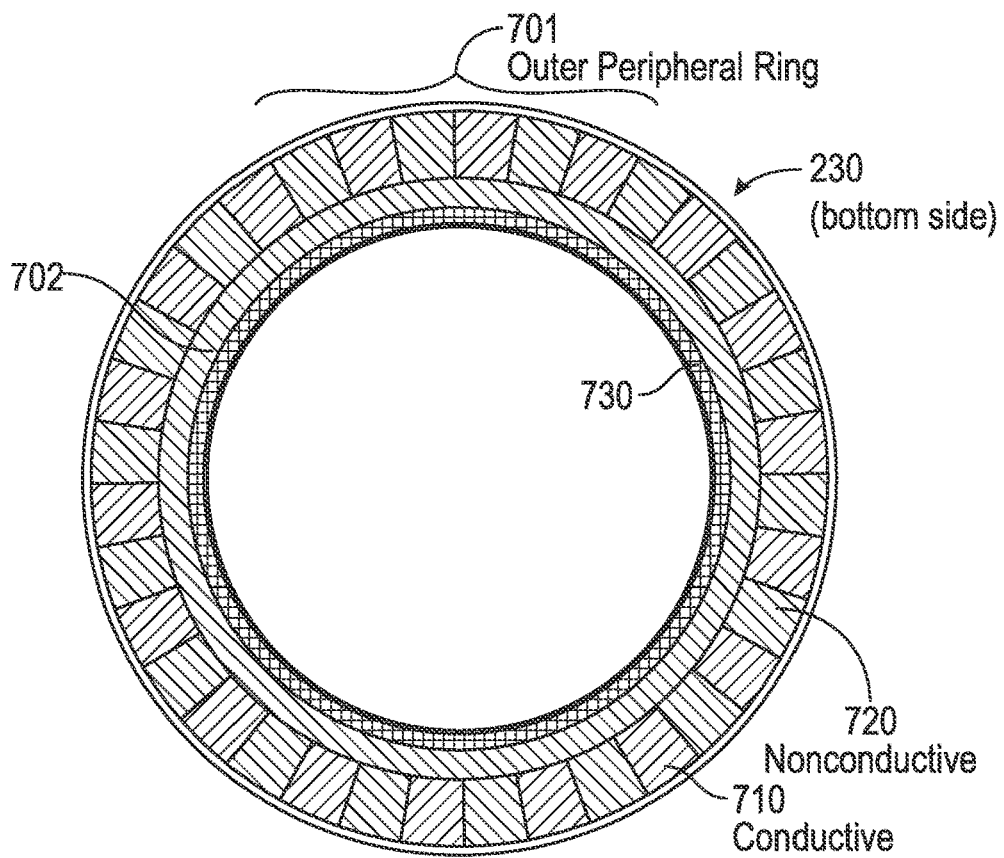
FIG. 7A illustrates a detailed bottom view of the rotary wheel of FIG. 3 according to one or more examples of the present disclosure.

FIG. 7A illustrates a detailed bottom view of the rotary wheel of FIG. 3. For instance, as in the case of the top surface of the fixed base, there are essentially two ring shaped structures—an outer peripheral ring 701, which comprises alternating first conductive regions 710 and non-conductive 720 regions, and an inner ring which comprises a single connected second conductive region 730. Furthermore, the ring-shaped region 702, provided between the outer peripheral ring 701 and the inner ring second conductive region 730, is also non-conductive. In some instances, the first and second conductive regions 710, 720 are used to sense rotation, and the inner ring second conductive region 730 is used to sense "click."

Figure 7B:
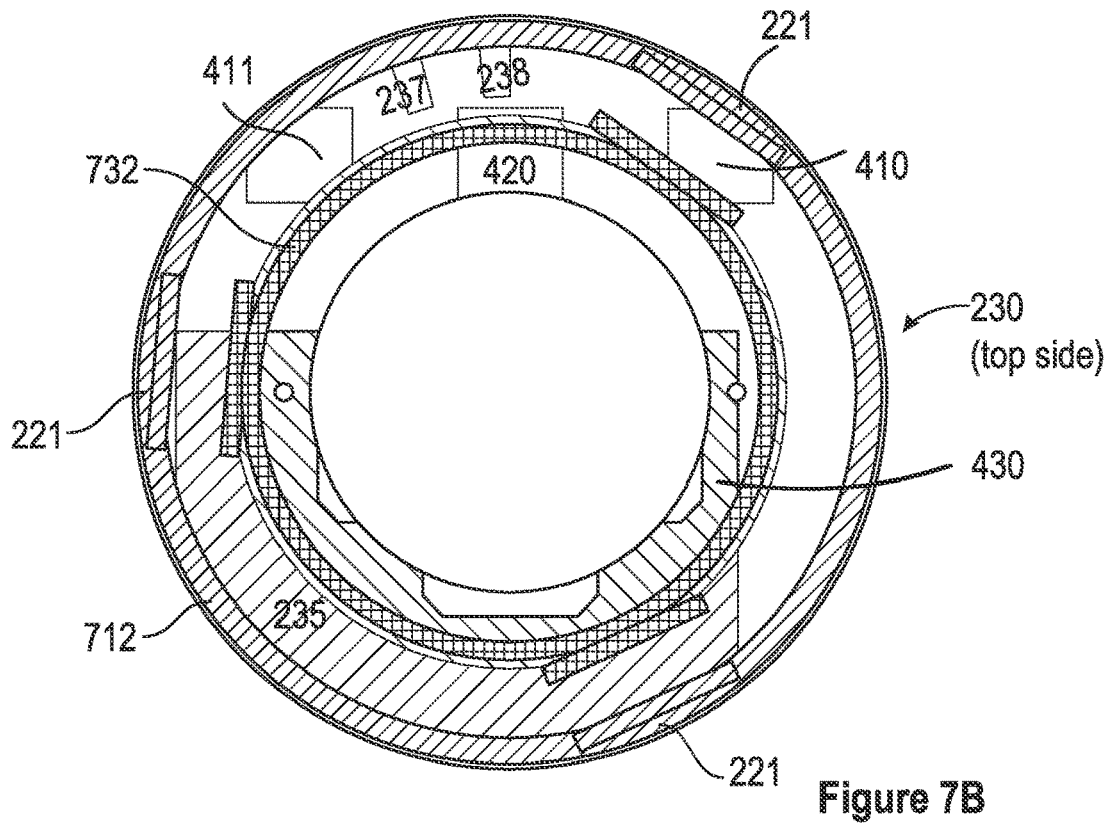
FIG. 7B illustrates a detailed top view of the rotary wheel of FIG. 7A according to one or more examples of the present disclosure.

FIG. 7B illustrates a detailed top view of the example rotary wheel of FIG. 3. The view of FIG. 7B corresponds to the view of the top surface of rotary wheel 230 shown in FIG. 6B that illustrates three sets of pads 221, which each respectively connect to a switch. As noted above, the switches may be dome switches, for example. However, the top view of FIG. 7B is drawn transparently, to show the underlying conducting rings to which each set of pads 221 is respectively coupled, as well as the other conductive regions on the bottom and top surfaces of the fixed base, previously described. These include, as shown here via the transparency, and as shown in FIG. 4A, on the bottom surface of fixed base 231, sensing electrodes 410, 420 and 411 and the set of electrodes 430 that is coupled to a reference signal of the input device; and on the top surface of fixed base 231, a portion of peripheral ring 235, and conductive pads 237 and 238.

In some instances, the conductive regions 710, as well as conductive pads 237 and 238, and peripheral ring 235, may be made of known conductors, such as, for example, copper, silver, gold, aluminum, or other conductors, or, for example, various alloys of any of those, with each other, or with different elements or compounds. Similarly, in some examples, non-conductive regions 720 may be regions of a printed circuit board or substrate on which no metal is deposited, and thus be made of epoxy plastic and fiberglass, for example, or, for example, non-conductive regions 720 may be formed by depositing an insulating layer such as, for example, a silicon dioxide ($SiO_2$) layer.

As shown in FIG. 7B, there are two ring shaped conductive regions, namely the outer ring region 712 and the inner ring region 732, for example, provided just under the surface of the top side of the rotary wheel 230. The outer ring region 712 is electrically connected to each of the first conductive regions 710 on the bottom side of the rotary wheel, as shown in FIG. 7A. Similarly, the inner ring region 732, provided on the inner periphery of the top side of the rotary wheel 230, is electrically connected to the second conductive inner ring region 730 on the bottom side of the rotary wheel, also shown in FIG. 7A. Additionally, in the depicted example of FIG. 7B, while the positions of the three sets of pads 221 to which the three switches are to be connected are shown, the switches that are to respectively connect to them are not shown. Thus, when the switches are closed, by a user pushing down on the cover cap 215 (shown in FIGS. 2 and 3) until the switches make a clicking sound or equivalent, the inner portion of each pad is electrically connected to the outer portion of each pad, which causes regions 712 and 732 to be electrically connected. This also causes, with reference to FIG. 7A, all of the respective first conductive regions 710 to be connected to the inner ring second conductive region 732. It is noted that there may be more or less switches, and corresponding sets of switch pads to which they connect, in alternate embodiments. In some instances, the switch pads 221 may be placed equidistantly around the rotary wheel 230. In some variations, the switches may have more than two states, and thus have more positions than "compressed" or closed, and "uncompressed" or open."

Figure 8:
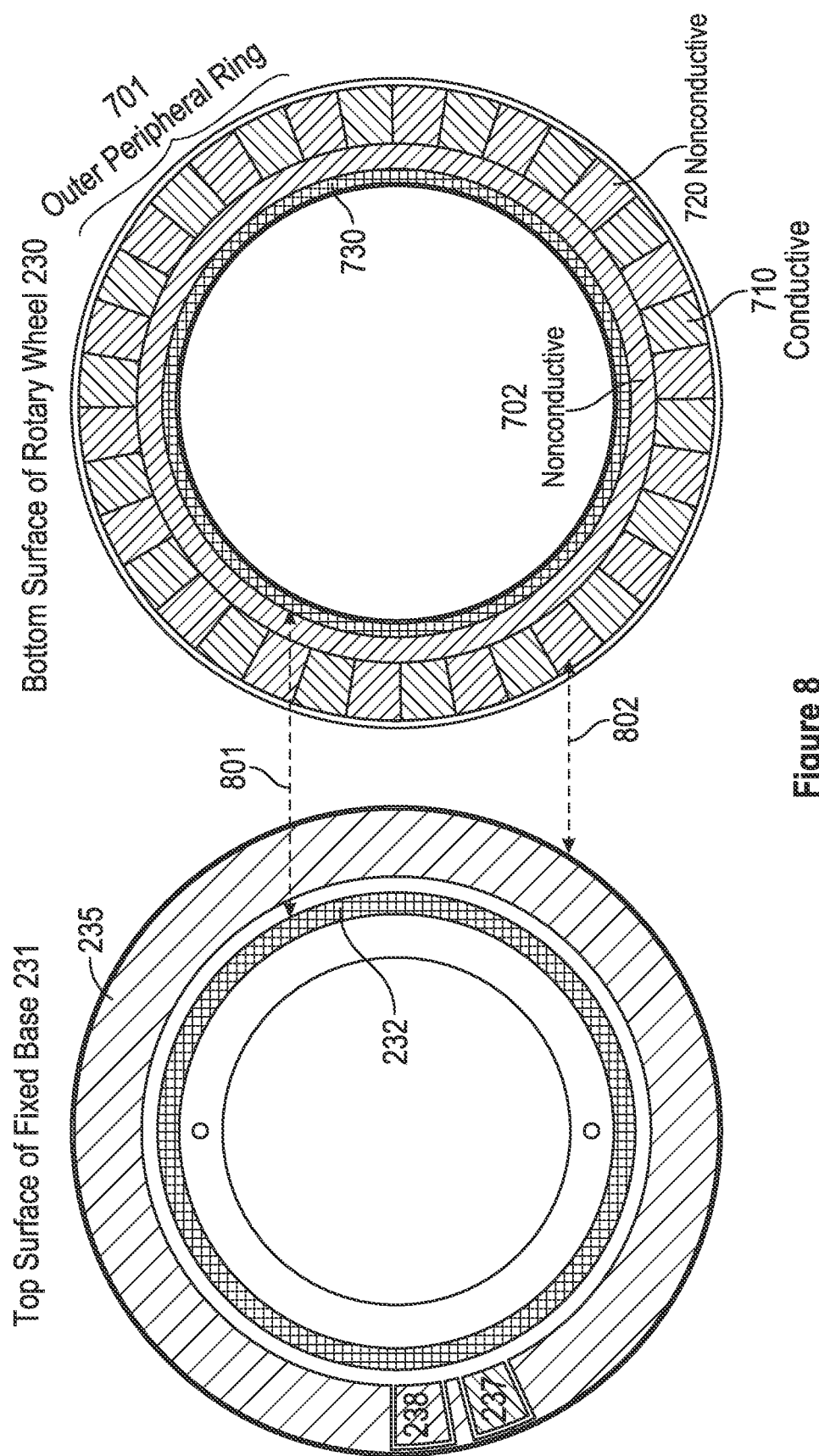
FIG. 8 depicts the top view of the example fixed base and the bottom view of the example rotary wheel, as shown in FIGS. 5 and 7A, respectively, and capacitive coupling between them according to one or more examples of the present disclosure.

Regarding the top and bottom surfaces of the fixed base 231 and the rotary wheel 230, FIG. 8 illustrates the electrical coupling between the top surface of the fixed base 231 and the bottom surface of rotary wheel 230, which, in one or more embodiments, face each other in the assembled rotary knob interface, when the rotary wheel 230 sits above the fixed base 231. With reference thereto, dashed arrow 801 depicts the electrical coupling between inner ring 232 of the top surface of the example fixed base 231, and the inner ring 730 of the bottom surface of the example rotary wheel 230. Additionally, dashed arrow 802 depicts the electrical coupling between peripheral ring 235 of the top surface of the example fixed base 231, which includes conductive pads 237 and 238, and the various conductive regions 710 of the outer peripheral ring 701 of the bottom surface of the example rotary wheel 230. As noted above, the regions 720 of the outer peripheral ring 701, of the bottom surface of the rotary wheel 230, are non-conductive, as shown, as is the non-conductive divider ring 702, which is provided between the outer peripheral ring 701 and the inner conductive ring 730. In some examples, the respective pairs of regions indicated by the dashed arrows 801 and 802 are capacitively coupled, given the non-conductive horizontal plastic bearing 226 that sits between the two surfaces, as described above with reference to FIG. 6A.

As shown in FIG. 8, when the rotary wheel 230 is positioned above the fixed base 231 (with the horizontal bearing between them), there may be various electrical couplings between their respective peripheral ring regions. While the peripheral ring 235, which is coupled to a reference signal of the input device via the set of electrodes 430, may be capacitively coupled to a number of conductive regions 710 of the rotary wheel underside, whether one or both of the conductive pads 237, 238 are coupled to conductive pads 710 of the rotary wheel underside depends upon the relative rotational position of the rotary wheel 230 and the fixed base 231.

In some examples, in order to sense rotation, the two conductive pads 237 and 238 on the top surface of fixed base 231 may be coupled to electrodes on the surface of the input device that are respectively driven with sensing signals. As noted above with reference to FIG. 4A, the conductive pads 237 and 238 on the top surface of fixed base 231 are respectively electrically connected with the sensing electrodes 410 and 411 provided on the bottom surface of the fixed base 231. In turn, the sensing electrodes 410 and 411 are coupled to corresponding input device electrodes that are driven with sensing signals, as shown, for example, in FIG. 4C. In some examples, by driving the input device electrodes that are respectively coupled to the fixed base sensing electrodes 410 and 411 with sensing signals, different resulting signals are received by those input device electrodes as a function of the capacitive coupling of each of the two conductive pads 237 and 238 on the top surface of fixed base 231 with the array of conductive 710 and non-conductive 720 regions on the bottom surface of the rotary wheel 230.

Figure 9:
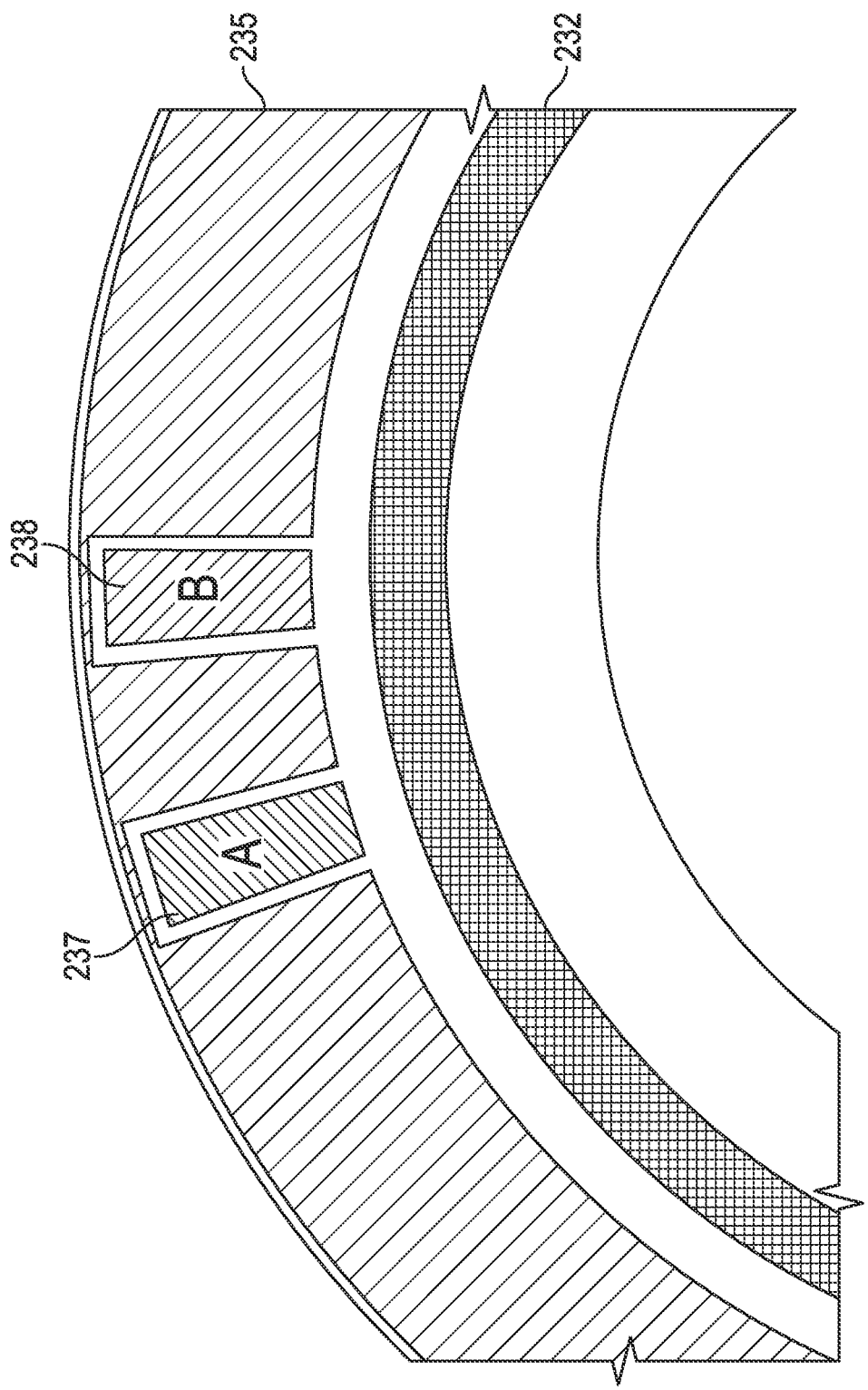
FIG. 9 illustrates example channel assignment of the outer region conductive pads of the top of the fixed base according to one or more examples of the present disclosure.

FIG. 9 is a small arcuate portion of the peripheral ring of the top surface of the fixed base. The portion shown corresponds to the portion of image shown in FIG. 7B that includes conductive pads 237 and 238. To distinguish the signals coupled to each conductive pad, with reference to FIG. 9, in some examples, the conductive pad 237 is assigned to channel A and conductive pad 238 is assigned to channel B. For convenience, for example, the conductive pad 237 may be referred to herein as the "channel A pad", and the conductive pad 238 may be referred to as the "channel B pad." By measuring resulting signals received by the electrodes (e.g., electrodes 410 and 411 as shown in FIGS. 4A, 4C, and 5) on the input device that are respectively coupled to each of conductive pads 237 and 238 at different points in time, the processing system 110 may determine the direction of the rotation. Also shown in FIG. 9 is the peripheral ring 235 (which is coupled to the set of electrodes 430 of the input device, and thus to the reference signal that drives them), and the inner ring conductive region 232 that is used to sense "click" of the switches closing.

Figure 10:
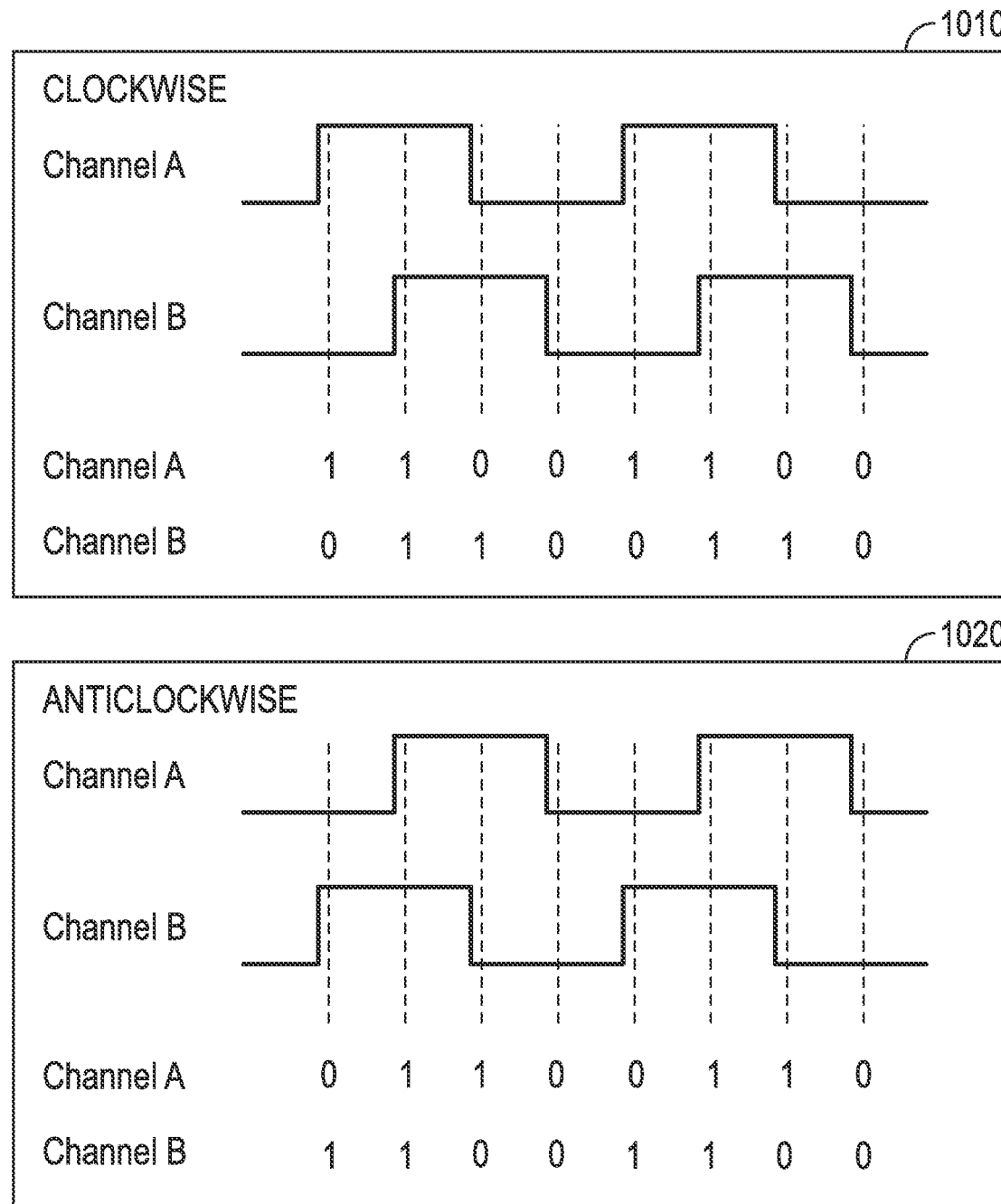
FIG. 10 illustrates example digitized quadrature encoder signals that may be generated by interaction of an example rotary wheel with an upper surface of the example fixed base of FIG. 9 according to one or more examples of the present disclosure.
Figure 11A:
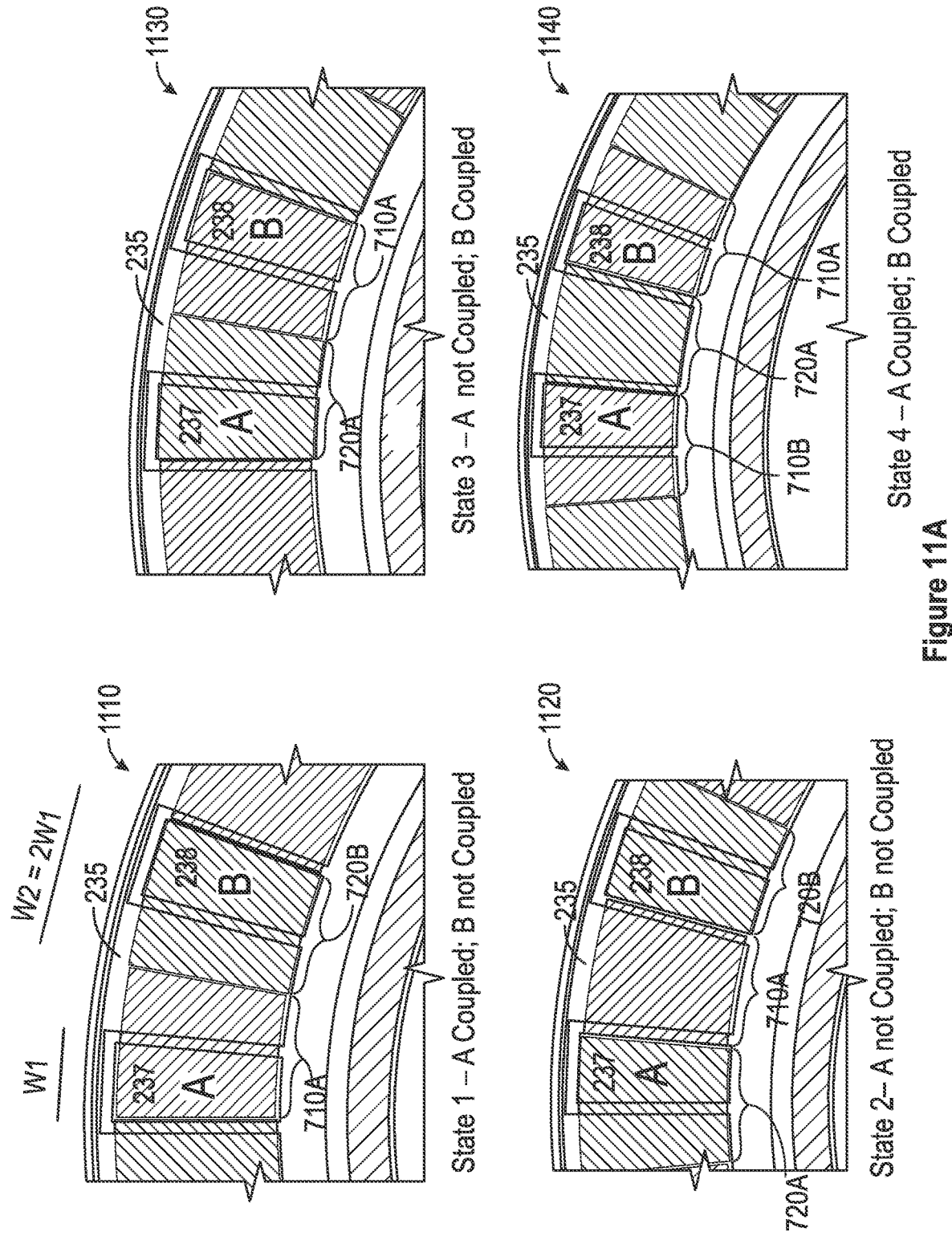
FIG. 11A illustrates four exemplary coupling states between the "A" and "B" designated conductive pads of the top of the fixed base of FIG. 9 and the bottom of the rotary wheel according to one or more examples of the present disclosure.

FIG. 10 illustrates example digitized quadrature encoder signals that may be generated by interaction of an example rotary wheel with an upper surface of the example fixed base of FIG. 9 according to one or more examples of the present disclosure. For instance, FIG. 10 illustrates examples of digitized quadrature encoder signals that may be generated by the interaction of the conductive pads 237 and 238 of the example fixed base having the example channel assignments shown in FIG. 9, with the alternating conductive 710 and non-conductive 720 regions of the outer peripheral ring on the bottom surface of rotary wheel 230, as rotary wheel 230 is rotated by the user. The generated signals have one sequence for clockwise rotation 1010, and another sequence for anticlockwise rotation 1020. The relative rotation may be determined in firmware by comparing successive sequences or states. As shown, the respective signals used for channels A and B are identical, but are shifted 90 degrees in phase. These signals may be better understood with reference to all of the possible overlap states between conductive pads 237 and 238 of fixed base 231 with the underside pattern of rotary wheel 230, as is illustrated in FIG. 11A. For instance, the four data points 1030 of the anticlockwise rotation sequence 1020 are shown in and described in FIG. 11A.

FIG. 11A illustrates four exemplary coupling states between the "A" and "B" designated conductive pads of the top of the fixed base of FIG. 9 and the bottom of the rotary wheel according to one or more examples of the present disclosure. For instance, FIG. 11A illustrates four possible coupling states, 1110 through 1140, of the "A" and "B" designated conductive pads 237 and 238 on the top of the fixed base 231 of FIG. 9, with the pattern of alternating conductive 710 and non-conductive 720 regions of the outer peripheral ring on the bottom of the rotary wheel 230. In FIG. 11A, only a small portion of the peripheral ring 235 of the fixed base, near where the conductive pads 237 and 238 are provided, is shown. The relative positions of the conductive pads 237 and 238 to the underside of the rotary wheel 230 generate the illustrated signals. FIG. 11A also shows a small portion of the peripheral ring 235 of the top of fixed base 231, as shown in FIG. 9 and described above, which surrounds conductive pads 237 and 238. Each of the four states depicted in FIG. 11A has a corresponding data point (e.g., state) in the encoder signals of FIG. 10. For instance, in FIG. 11A, the view is from under the top surface of the fixed base 231, looking upwards, with conductive pads 237 and 238, and peripheral ring 235 shown transparently, so that the alternating conductive 710 and nonconductive 720 peripheral regions on the bottom of the rotary wheel 230 are seen in the background. To distinguish conductive and non-conductive regions 710 and 720, conductive region 710 is shaded using diagonal lines that run from top left to bottom right ("backslash"), and non-conductive region 720 is shaded with diagonal lines that run from bottom left to top right ("frontslash"), as shown.

In the depicted example of FIG. 11A, the alternating conductive 710 and non-conductive 720 regions have the same shape and size. It is also noted that in the depicted example of FIG. 11A, the conductive pads 237 and 238, carrying channels A and B, respectively, on the upper surface of fixed base 231 are sized such that their pad width, W1 is one-half the width W2 of a conductive 710 or non-conductive 720 region of the bottom of the rotary wheel, such that two of conductive pads 237 or 238 could fit within, or underneath, one conductive 710 or non-conductive 720 region. Further, the conductive pads 237 and 238 are separated from each other by two conductive pad widths W1, or one region (710, 720) width W2. The four states, as shown, indicate an anticlockwise rotation of the rotary wheel 230 relative to the fixed base 231. Accordingly, because, as noted, the view is from underneath the upper surface of the fixed base 231 looking into the bottom of the rotary wheel 230, it appears that the conductive pads 237 and 238, carrying channels A and B respectively, while in reality stationary, are moving anti-clockwise relative to the bottom of the rotary wheel 230.

Beginning with State 1 1110, the channel A pad 237 of the upper surface of the fixed base 231 is coupled to a conductive region 710A of the bottom surface of the rotary wheel 230, but the channel B pad 238 is not, being underneath a non-conductive region 720B of the bottom surface of the rotary wheel 230, as shown. Thus, in terms of the encoder signals of FIG. 10, which follow the convention that "coupled to a conductive region 710"=1, and "coupled to a non-conductive region 720"=0, channel A has a 1 and channel B a 0, or an overall (A,B) value of (1,0). At State 2 1120, which indicates a one pad width W1 turn (which is a one half of a conductive or non-conductive region width W2 turn) of the rotary wheel 230 to the right, moving A pad 237 over to the left under a next non-conductive pad 720A, and moving B pad 238 to be under the left side of non-conductive pad 720B, now neither the A pad nor the B pad is coupled to a conductive region 710, and thus both channels A and B have a value of 0, or an overall (A,B) value of (0,0). The change from (A,B)=(1,0) to (0,0) is shown in FIG. 10 in the example anticlockwise signal set 1020 as the third and fourth data points in the sequence. At State 3 1130, A pad 237 has now moved by a single W1 turn to the left to be under the left side of non-conductive region 720A, and thus the A pad is still not coupled, but the B pad has moved one W1 turn to be underneath the right side of conductive region 710A, and now is coupled. Thus, channel A has a 0 value and channel B a 1 value, for an overall (0,1) value. Finally, at State 4 1140, the pads A and B have moved another single W1 turn to the left, corresponding to the rotary wheel above having turned another W1 turn to the right. Now both the A channel pad 237 and the B channel pad 238 are coupled to conductive regions of the rotary wheel underside. Pad A 237 has moved to the right side of conductive region 710B, and pad B 238 has moved to the left side of conductive region 710A, and thus both channels A and B have values of 1, for an overall (A,B)=(1,1).

Thus, the progression of data points (A,B) through the four states of FIG. 11A is from (1,0) to (0,0) to (0,1) to (1,1). As shown at 1030 of FIG. 10, this sequence indicates an anticlockwise rotation. As noted above, it is here assumed that when a conductive pad 237 or 238 of the fixed base 231 is aligned with a conductive region 710 of the rotary wheel 230's underside, its signal value=1, and when the conductive pad 237 or 238 is aligned with a non-conductive region 720 of the underside of rotary wheel 230, its signal value=0. In alternate examples, the inverse convention may be used.

In some examples, there is a relationship between the widths of conductive pads 237 and 238 (which have the same width, W1), and the widths of a conductive 710 or non-conductive 720 region (which have the same width, W2). In some instances, it is the relative widths of W1 and W2 that determine the resolution with which rotations of the rotary wheel 230 relative to the fixed base 231 may be detected. In one such instance, as shown in FIG. 11A, the width W1 of each of conductive pads 237 and 238 is one half the width W2 of an underside conductive or non-conductive region 710 or 720. Thus, in such instances, a change in rotation as a conductive pad 237 or 238 moves a W1 step may be detected. This is because in a W1 sized step a conductive pad 237 or 238 either moves from being under one side of a region 710 or 720 to the other side of that region, as is shown in FIG. 11A for conductive pad 238 moving from one side of non-conductive region 720B to the other side of that region, between State 1 and State 2, or in a W1 sized step it moves from a second side of a region 710 or 720, to a first side of an adjacent region of the other type, as shown, for example, in FIG. 11A for conductive pad 237 moving from the second side of conductive region 710A to the first side of non-conductive region 720A.

Figure 11B:
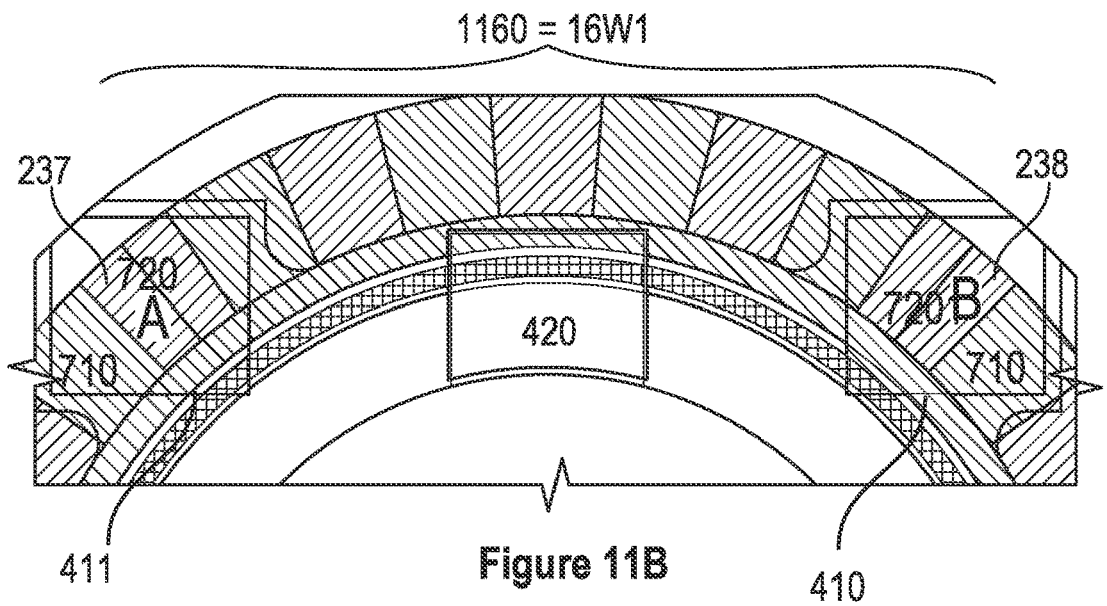
FIG. 11B illustrates an example distance between the two outer region conductive pads of the top of the fixed base of FIG. 9 according to one or more examples of the present disclosure.

FIG. 11B illustrates an example distance 1160 between conductive pads A 237 and B 238 of fixed base 231 in terms of the W1 conductive pad width. The point of view here in FIG. 11B is now from underneath the entire fixed base 231, looking upwards into essentially FIGS. 4C and 5, where the three sensing electrodes 411, 410 and 420 of the bottom surface of the fixed base, and the two conductive pads A 237 and B 238 on the top surface of the fixed base, are all shown in transparent mode. As shown, there are sixteen conductive pad width W1 divisions between conductive pads A 237 and B 238. There are seven conductive/non-conductive regions 710, 720 between them, of width W2 each, as well as two additional W1 width regions, one to the right of A pad 237 and the other to the left of B pad 238. Conductive pads 237 and 238 are positioned above their corresponding coupling electrodes 411 and 410, respectively, on the underside of the fixed base. The distancing of pads 237 and 238 by a distance equal to 16 W1 is so as to reduce parasitic coupling from other neighboring sensing pixels. Thus, in some examples, because coupling electrodes 411 and 410 have a specific location in alignment to the grid, as shown in FIG. 4C and described above, the conductive pads 237 and 238 are restricted to certain areas. In the example configuration of FIG. 11B, neither of the two conductive pads 237 and 238 are coupled to a conductive region of the underside of the rotary wheel. As shown, both are coupled to non-conductive regions 720. However, one turn to the right would move conductive pad 238, carrying the B channel, to couple to an adjacent conductive region, or, alternatively, one turn to the left would move conductive pad 237, carrying the A channel, to couple to an adjacent conductive region 710.

Figure 12A:
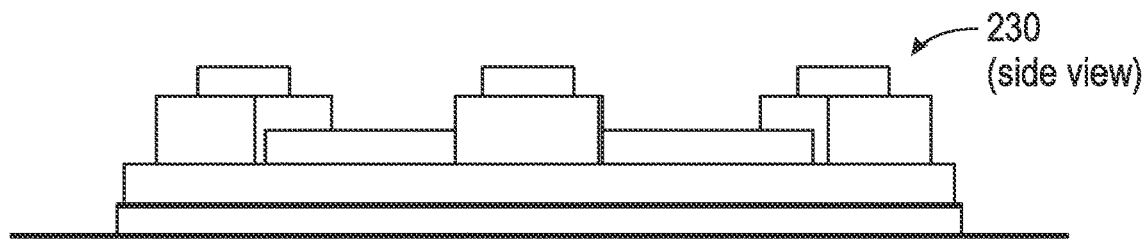
FIG. 12A is a side view of an example rotary wheel, illustrating three example switches provided on its upper surface and equidistantly spaced according to one or more examples of the present disclosure.
Figure 12B:
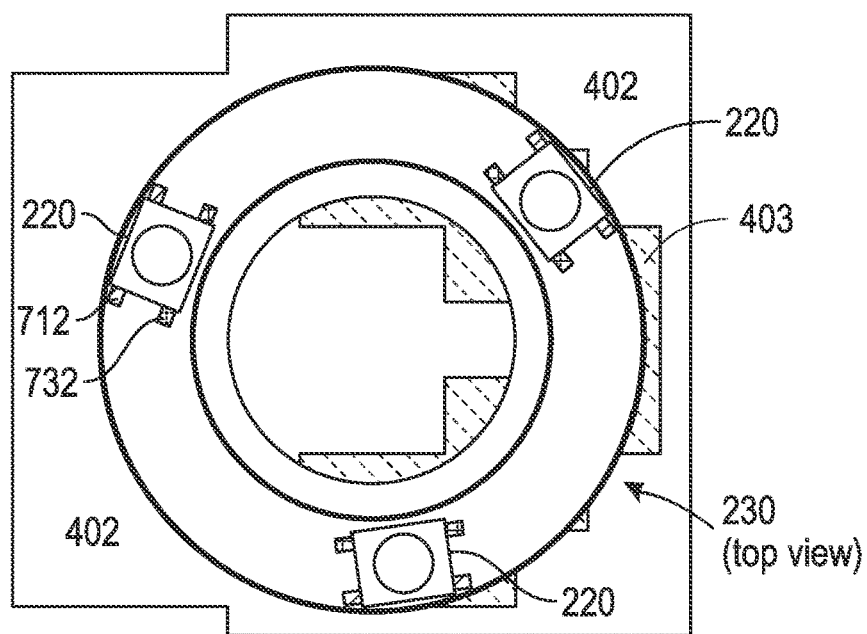
FIG. 12B is a top view of the example rotary wheel of FIG. 12A, illustrating the three example switches as provided above the example sensor grid of an example input device as shown in FIG. 4B according to one or more examples of the present disclosure.

Next described is the click, or mechanical response functionality, of pushing the switches closed, and how that is detected in one or more embodiments. In that connection, FIG. 12A is a side view of an example rotary wheel 230, illustrating three example switches 220 provided on its upper surface and equidistantly spaced, according to one or more embodiments. In some instances, switches 220 are dome switches. Similarly, FIG. 12B is a top view of the example rotary wheel of FIG. 12A, illustrating the three example switches as provided above the example sensor grid of an example input device as shown in FIG. 4B, according to one or more examples, with electrode regions 402 and 403, as described in FIG. 4B. When switches 220 are closed, the two conducting regions 712 and 732, as shown in FIG. 7B, are electrically connected, which is sensed by the input device. As noted above, in one or more variations, rotation of the knob interface by a user and pushing down on the knob interface so as to close the switches are orthogonal acts, and do not interfere with one another. This is because whether or not switches 220 are closed does not affect the relative rotation of the fixed base 231 and the rotary wheel 230, or the ability of a user to further rotate them.

Figure 13A:
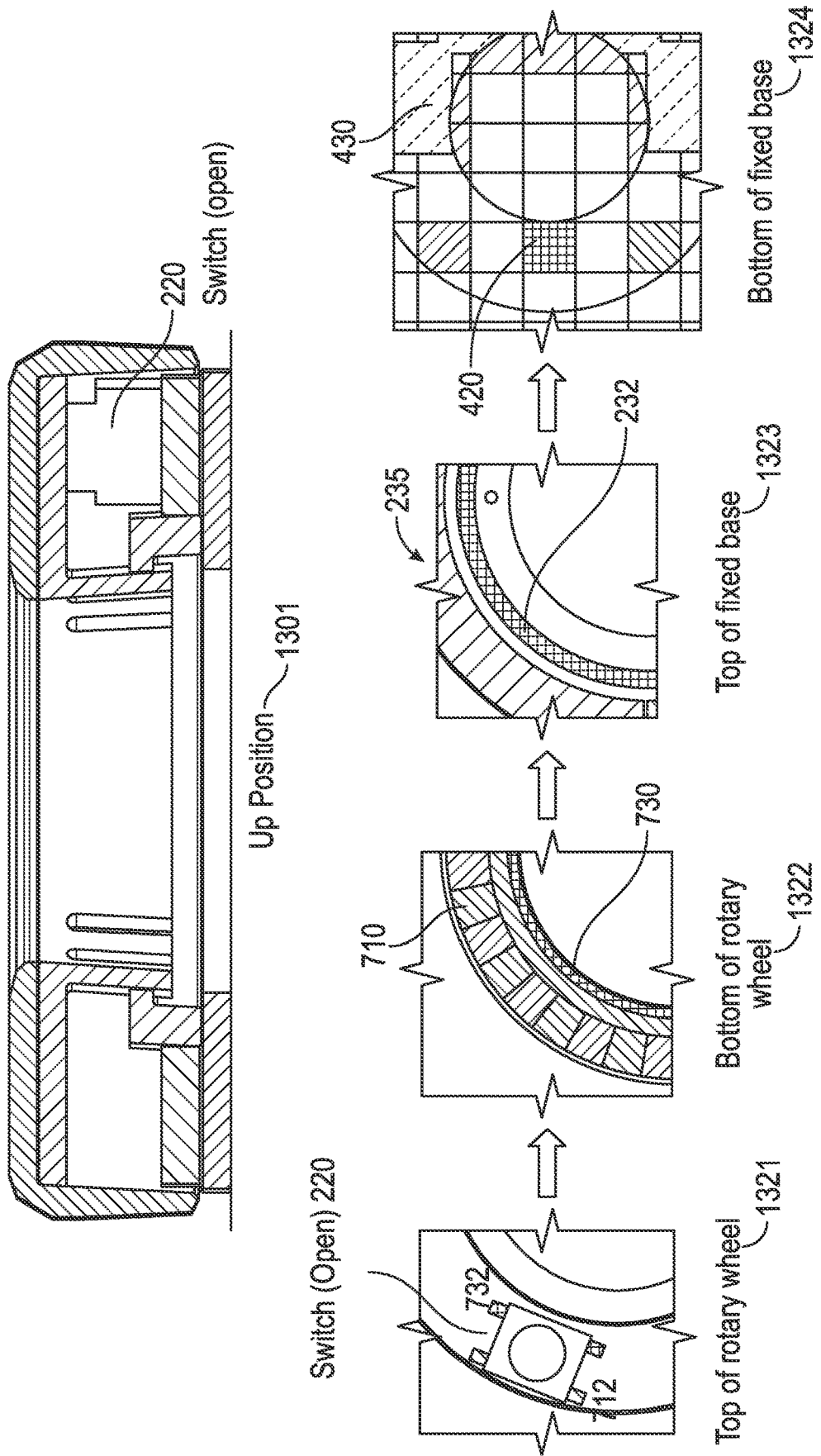
FIG. 13A illustrates a cut-away view illustrating the up position of the example rotatable knob interface of FIGS. 2 and 3, where switches are open according to one or more examples of the present disclosure.

As noted above, a user closes the switches by pushing down on the outer cap 215 of FIG. 3. FIG. 13A illustrates a cut-away view illustrating the up position 1301 of the example rotatable knob interface of FIGS. 2 and 3, where switches 220 are open, according to one or more examples. FIG. 13A also shows the states of each of the upper and lower surfaces of each of the rotary wheel and the fixed base when the switches are open. As shown in FIG. 13A, drawing 1321 illustrates the top surface of the rotary wheel. Here, when the switch 220 is open, as indicated, there is no connection between the two conducting rings 712 and 732, described above, that are provided near the upper surface of the rotary wheel. As a result, corresponding regions 710 and 730 on the bottom surface of the rotary wheel, as shown at drawing 1322, are also electrically isolated from one another. Thus, as a further result, on the top surface of the fixed base 231, as shown at drawing 1323, inner conducting ring 232 remains isolated from peripheral ring 235, which is coupled to a reference signal via the set of electrodes 430 on the underside of the fixed base, and thus, on the bottom of fixed base, as shown in drawing 1324, electrode 420 (driven by a sensing signal) and the set of electrodes 430 (driven by a reference signal) remain electrically isolated form one another.

Figure 13B:
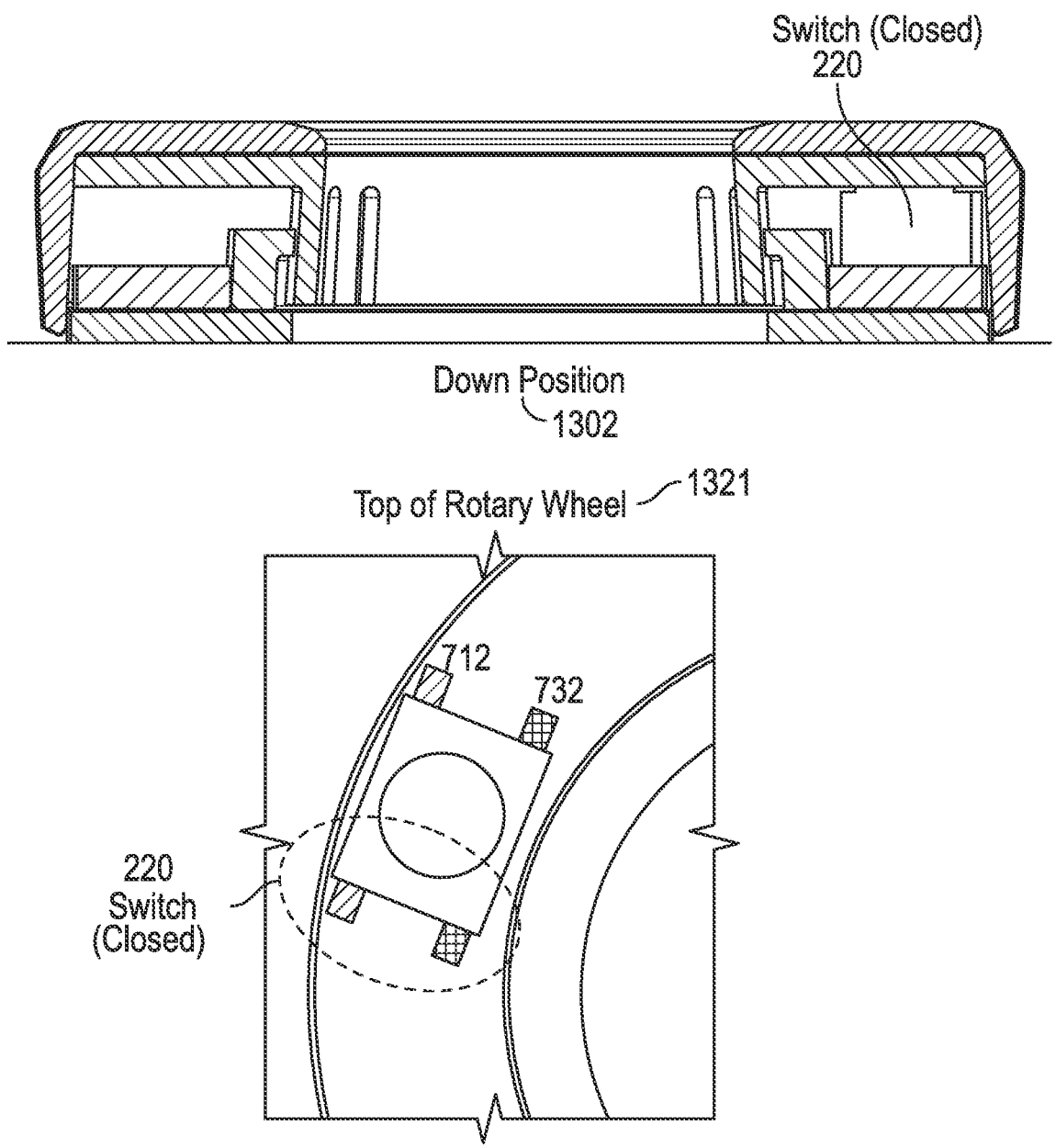
FIG. 13B illustrates a cut-away view illustrating the down position of the example rotatable knob interface of FIGS. 2 and 3, in which position the switch is closed according to one or more examples of the present disclosure.

Similarly, FIG. 13B illustrates a cut-away view illustrating the down position 1302 of the example rotatable knob interface of FIGS. 2 and 3, when the switches 220 are closed, as indicated in drawing 1321, according to one or more examples. In this case, again with reference to FIG. 13A, there is an electrical connection between the two rings 712 and 732 provided near the top surface of the rotary wheel (as described above with reference to FIG. 7B), and thus the corresponding conductive regions on the bottom of the rotary wheel, namely the conductive regions 710 (all of which are electrically connected to each other) and inner ring 730, as shown at drawing 1322. Further, as shown at drawing 1323, inner conducting ring 232 is now electrically connected to peripheral ring 235 on the top of the fixed base 231, and, as a result, on the bottom of fixed base 231, as shown in drawing 1324, electrode 420 is electrically coupled to the set of electrodes 430 that are coupled to a reference signal of the input device. It is here noted that when the switches are closed, the conductive regions 710, in addition to being coupled to peripheral ring 235, are also partially coupled to the conductive pads 237 and 238 on the top of the fixed base 231. Thus, there may be a slight effect on the signal on inner ring 730 (via electrode 420) when the switches are closed. In particular, when the switches are closed, there will be a slight drop in signal for rotation. Also, electrodes 410 and 411 may also see a slight drop in signal if their corresponding upper conductive pads 237 and 238 are both coupled to conductive regions 710 of the underside of the rotary wheel (as is shown in FIG. 11A, state 4 1140). This is because instead of having just two electrodes 410 and 411 that are coupled to ground, now a third electrode 420 is also coupled to ground due to the switch closing, thus sharing part of the ground (reference) signal provided by the input device's region 403, shown in FIG. 4B. Notwithstanding this small change in signal strength, as noted above, in some instances, detection of rotation of the wheel fully operates even while the switches are closed.

Figure 14:
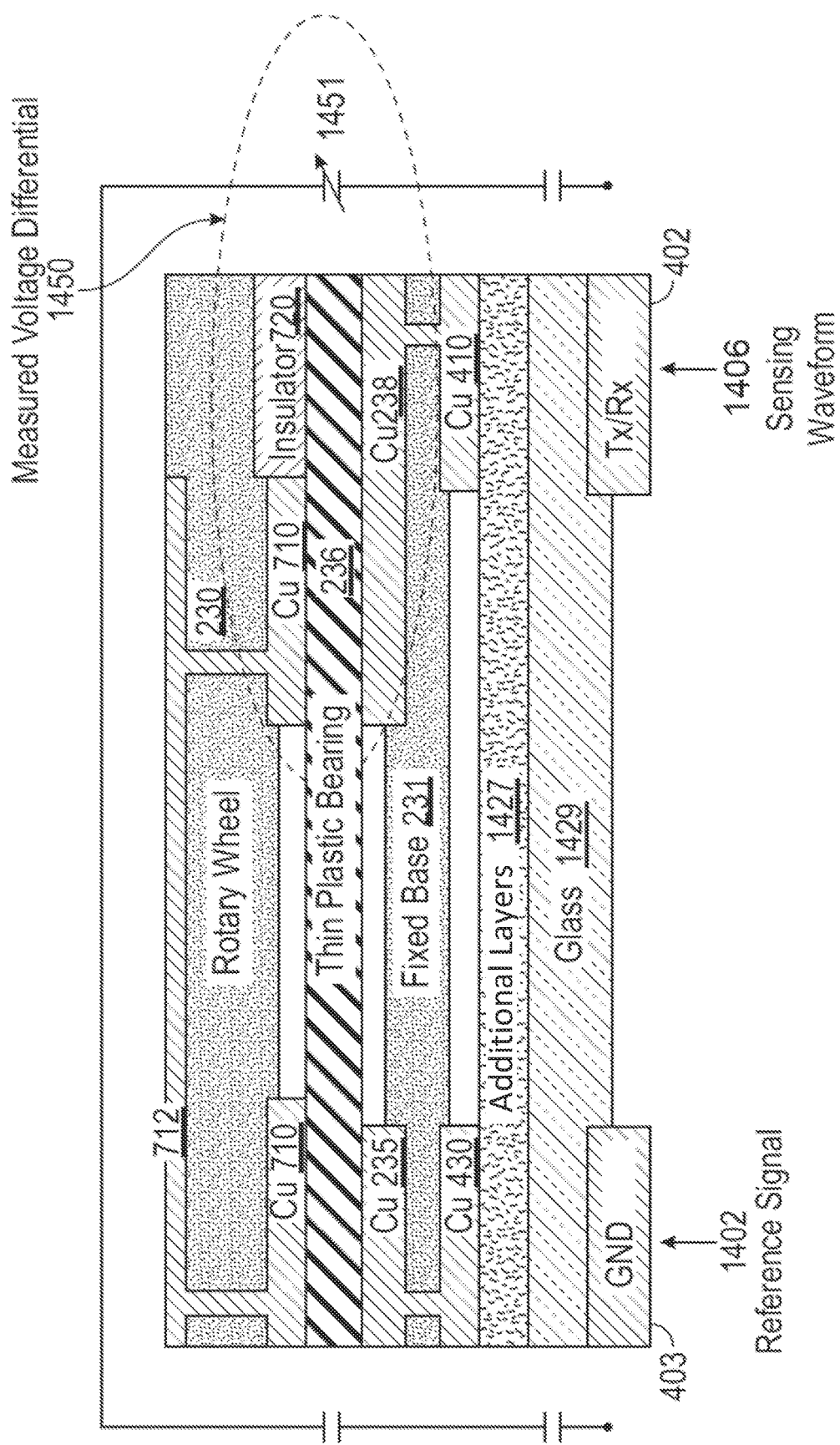
FIG. 14 depicts a schematic cross-section of an example rotatable knob interface, implemented on an input device having a sensing grid according to one or more examples of the present disclosure.

FIG. 14 depicts a schematic cross-section of an example rotatable knob interface, implemented on an example input device having a sensing grid, according to one or more examples. With reference thereto, beginning at the bottom of FIG. 14, there is shown an upper portion of an example input device, namely glass layer 1429 and two exemplary electrodes 402 and 403 below it. It is noted that, for consistency, the same indexing numbers that were used in FIGS. 4A through 4C for analogous elements, are used here. In the depicted embodiment, glass layer 1429 may be the upper surface of an example input device, such as, for example, a display in an automobile infotainment system. Additionally, and/or alternatively, the glass layer 1429 may be the bottom portion of the knob interface 150. The two representative electrodes 402 and 403 (e.g., grid electrodes) are equivalent to those as shown in FIG. 4B, for example. In the example of FIG. 14, these electrodes are part of a sensing grid. As shown, electrode 403 is driven with a reference signal 1402, for example ground, and electrode 402 is driven with a sensing waveform 1406, as described above. Further, as shown, the electrodes 402 and 403 may be located below the fixed base 231 and/or positioned within the interior of the fixed base 231.

Continuing with reference to FIG. 14, above glass layer 1429 there is provided one or more additional layers 1427. In some instances, the one or more additional layers 1427 may include the transparent conductive material (e.g., a transparent conductive material layer), an adhesive layer, and/or one or more additional layers. The adhesive layer may secure a fixed base of an example knob interface to the glass surface 1429, and thus to the example input device. From additional layer 1427 to the top of the figure are components of the example knob interface. Thus, there is a fixed base 231 and a rotary wheel 230, both as described above, with a thin plastic horizontal bearing 236 provided between them. Fixed base 231 has a bottom surface and a top surface, as described above. The bottom surface is provided with coupling electrodes 410 and 430, where 430 couples to reference signal electrode 403 of the example input device, and 410 couples to sensing electrode 402 of the example input device, as described above with reference to FIG. 4C, with the caveat that the cross sectional view of FIG. 14 does not include all of the coupling electrodes of the bottom surface of fixed base 231. Furthermore, as mentioned above, the additional layers 1427 may include transparent conductive material so as to couple additional grid electrodes to the electrodes 410 and 430.

Continuing back to the top surface of the fixed base 231, the top surface of fixed base 231 includes peripheral ring 235, which is connected, as shown, to set of electrodes 430, which itself is coupled to reference signal carrying electrode 403. The top surface of fixed base 231 also includes conductive pad 238, which is electrically connected to electrode 410.

Continuing further with reference to FIG. 14, above the top surface of fixed base 231 there is horizontal thin plastic bearing 236, as shown, and above the thin plastic bearing 236 is provided rotary wheel 230. Rotary wheel 230, as shown, has a bottom surface on which is provided with both conductive regions 710 and non-conductive regions 720, as described above. In FIG. 14, these are shown as being radially side by side for ease of illustration. However, as shown above in the example of FIG. 8, these two regions are actually provided side by side around the periphery of the wheel, at the same radial distance from the center (e.g., one in front of the other in a dimension coming out of the page in FIG. 14). As also shown by connector 712, all of the conductive regions 710 of the rotary wheel are electrically interconnected, as described above with reference to FIG. 7B. In some instances, as the rotary wheel 230 rotates, a circuit is coupled when the conductive region 710 of the wheel overlaps conductive pad 238 of the base, and is electrically decoupled when the non-conductive region 720 of the wheel overlaps conductive pad 238 of the base. This creates a voltage differential 1451 between rotary wheel 230 and fixed base 231 which, in some variations, is measured by the input device. Similarly, although not shown in the cross-section drawing of FIG. 14, a circuit is coupled when the conductive pad 237 of the base is directly underneath, and thus coupled to, a conductive region 710 of the underside of the rotary wheel 230, and is electrically decoupled when the non-conductive region 720 of the wheel overlaps conductive pad 237 of the base.

As shown in FIG. 14, the change in coupling of conductive pad 238 from insulator 720 to conductor Cu 710, via rotation of rotary wheel 230, changes the capacitance 1451, which can, in some variations, be measured by voltage differential 1450. This measurement is used to detect the relative rotational position of rotary wheel 230 with respect to fixed base 231, as described above.

FIG. 15 depicts another schematic cross-section of an example rotatable knob interface, implemented on an example input device having a sensing grid, according to one or more examples. For instance, FIG. 15 shows the cover glass 1429 of FIG. 14 as well as the knob hardware 1510 described in FIG. 14 (e.g., the fixed base 231, the electrodes 430, 235, 710, and so on, the rotary wheel 230, and other hardware components of FIG. 14). Further, FIG. 15 shows the different additional layers 1427. For example, the additional layers 1427 include an optically clear adhesive 1502, transparent film 1504, transparent conductive material 1506, and protective film 1508.

Starting from the bottom, the cover glass 1429 is described above. For instance, the glass layer 1429 may be the upper surface of an example input device or the bottom portion of the knob interface 150. The glass layer 1429 may include a glass portion that is overlaid to cover the electrodes of the input device 100. In some variations, the glass layer 1429 may comprise and/or be made of plastic and/or another type of non-conductive material. For instance, in some examples, the glass layer 1429 might not be made of glass, but instead made of plastic such as polyethylene terephthalate (PET) and/or poly(methyl methacrylate) (PMMA). In yet other examples, the glass layer 1429 may be made of a non-conductive material (e.g., an opaque non-conductive material).

The optically clear adhesive 1502 may be an adhesive layer that includes adhesive to secure the cover glass 1429 (e.g., the input device 100) to a portion of the knob interface 150. For instance, the optically clear adhesive 1502 may include, be, and/or comprised of adhesive that is optically clear. The optically clear adhesive 1502 may attach the cover glass 1429 to the transparent film 1504. In some instances, the optically clear adhesive 1502 may be designed or configured to be around 95% transparent or higher than 95% transparent. In other instances, the optical clear adhesive 1502 may be designed or configured with a different transparency percentage.

The transparent film 1504 may be a layer of film that is transparent (e.g., a plastic film that is clear or glass). In some instances, the transparent film 1504 may be made of a lower resistance and conductive transparent material. In other instances, the transparent film 1504 may be made of a non-conductive material. In some instances, the transparent film 1504 may be designed or configured to be above 80% transparent (e.g., a minimum of 80% transparent). In other instances, the transparent film 1504 may be designed or configured with a different transparency percentage.

The transparent conductive material 1506 may be and/or include material that is transparent and conductive. For instance, the transparent conductive material 1506 may include, be, and/or comprise ITO, metal-mesh or other types of materials. The transparent conductive material 1506 may include a conductive pattern such as a pattern of ITO. By using the transparent conductive material 1506, the pixels or electrodes (e.g., the grid electrodes 401) underneath the knob may be used such as the pixels or electrodes that are within the center region of the fixed based 231 shown in FIGS. 4A-4C. Additionally, and/or alternatively, the transparent conductive material 1506 may allow use of the pixels or electrodes within the center region while still allowing display of information within the center region. For instance, the input device 100 may seek to display information (e.g., messages or inputs) within the center region of the knob interface 150. For example, the knob interface 150 may be rotated to adjust the volume of one or more speakers for an automobile. The input device 100 may seek to display information such as the current indicated volume for the speakers. By using the transparent conductive material 1506, the grid electrodes underneath the center region of the knob interface 150 (e.g., the electrodes located within interior of the fixed base 231) may perform one or more functions and information may still be displayed. In some variations, the transparent conductive material 1506 may have a generally low resistivity. For instance, the transparent conductive material 1506 may be and/or comprise ITO, which is around $10^{-3}$ ohm-centimeter (Ω·cm).

Figure 16:
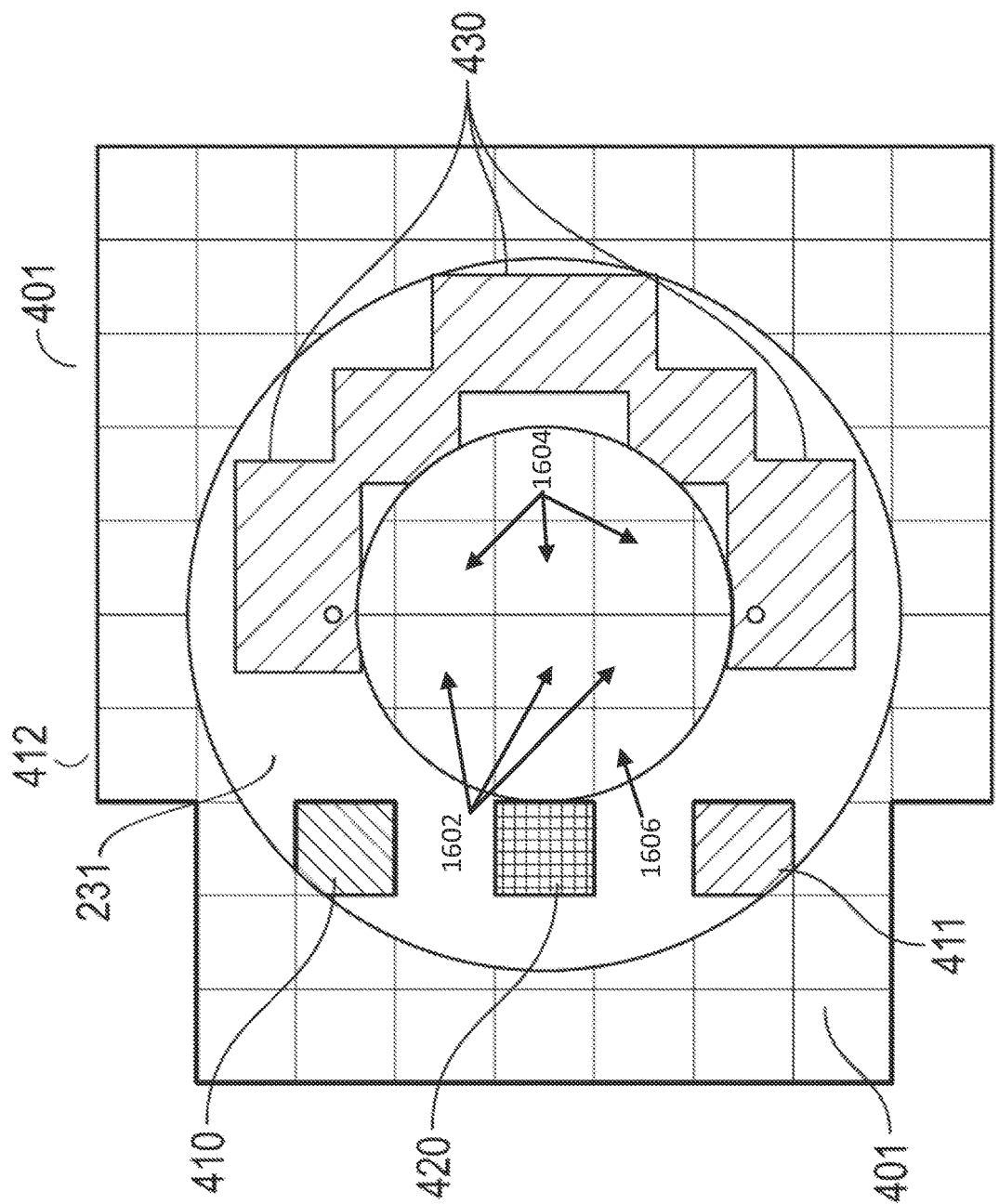
FIG. 16 illustrates an underside view of the fixed base of an example rotatable knob interface according to one or more examples of the present disclosure.

In some instances, the transparent conductive material 1506 may use a trace (e.g., a wire) to connect the grid electrodes to the knob hardware 1510 (e.g., the electrodes of the knob interface 150 such as the electrode 430 or 410). For example, FIG. 16 illustrates an underside view of the fixed base of an example rotatable knob interface according to one or more examples of the present disclosure. In particular, FIG. 16 is similar to FIG. 4A, but also labels the interior electrodes 1602 and 1604 and an electrode 1606 that overlaps the fixed base 231. For instance, the transparent conductive material 1506 may use a trace (e.g., a bridge) to electrically connect the interior grid electrodes 401 such as the electrodes 1602 and 1604 to the electrodes of the fixed base 231 such as the electrodes 410, 420, 411, and/or 430. By using the trace, the transparent conductive material 1506 may enable additional electrodes from the grid electrodes 401 (e.g., the electrodes or pixel 1602, 1604) to be used for one or more functionalities. For instance, the processing system 110 may provide one or more reference signals to the interior electrodes such as the electrodes 1604. Based on using the transparent conductive material (e.g., a trace within the transparent conductive material), the electrodes 1604 may be electrically coupled to the set of electrodes 430. As such, additional grid electrodes may be used for ground signals.

Additionally, and/or alternatively, the transparent conductive material 1506 may electrically connect the electrodes 1602 or 1604 to the sensing electrodes 410, 411, and/or 420 to perform one or more functions (e.g., rotation, click, grab, and so on). For instance, the electrodes 1602 may be connected to the sensing electrodes 410, 411, and/or other electrodes on the fixed base 231 (e.g., electrode 420 and/or other electrodes that are included in addition to or as an alternative to the sensing electrodes shown in FIGS. 4A-4C such as the electrode 1914 shown in FIG. 19). The knob interface 150 may use the connection provided by the transparent conductive material 1506 to perform functionalities described above such as rotation detection and/or click or compression detection of the knob interface 150. Additionally, and/or alternatively, further functionalities of the knob interface 150 may be included as there are more grid electrodes to use based on the transparent conductive material 1506.

In some instances, by connecting the electrodes 1602 and/or 1604 to one or more electrodes that are fixed on the base 231, the processing system 110 may use the electrodes for a click function. For instance, the signal may be obtained by the electrodes 1602 and/or 1604, and is routed within the knob interface to a dome switch. One side of the dome switch is connected to ground (e.g., through the grounded pads within the knob interface) while the other side is connected to the signal that is routed from the touch pixel below (e.g., the electrodes 1602 and/or 1604). When the knob interface is pressed (e.g., when an input object interacts with the knob interface), an established electrical path is created for the signal to be grounded through the knob interface and dome switch mechanism, thus a change in signal would occur for the touch pixel (e.g., the sensor electrode 420 shown in FIG. 4A). In some examples, the knob interface may be designed such that the electrode 420 is unable to be placed underneath the fixed base 231 due to sizing limits. In such examples, another touch pixel in the donut hole region (e.g., the center area) may be used to route to the underside of the knob interface. In some variations, the same mechanism may be used for the click functionality (e.g., sensing clicks).

In some variations, the processing system 110 may use the electrodes for a grab functionality. This is described in further detail in FIG. 24 below.

As explained above, the knob interface may use two sensing electrodes (e.g., electrodes 410 and 411) for sensing rotation. Additionally, and/or alternatively, a third electrode (e.g., an electrode within the center area such as electrodes 1602 and 1604) are used for sensing rotation. By using a third electrode, the angular resolution of the knob interface may be increased.

In some instances, the transparent conductive material 1506 may have the same shape as the knob interface 150 (e.g., the knob body) and may be adhered to the cover glass 1429 with the optically clear adhesive 1502.

The protective film 1508 may be placed on top of the transparent conductive material 1506. The protective film 1508 may be a film that provides protection to the transparent conducive material 1506 (e.g., protect the exposed conductive regions of the transparent conductive material 1506).

The knob hardware 1510 may include one or more components shown in FIG. 14. For instance, the knob hardware 1510 may include the electrodes 410 and 430, the fixed base 231, the thin plastic bearing 236, the conductive and non-conductive regions 710, 720, the rotary wheel 230, and/or other components shown in FIG. 14 and/or described above.

In some instances, based on the electrodes in the center of the fixed base 231 (e.g., the electrodes 1602, 1604, and/or 1606) being used for grounding signals, the transparent conductive material 1506 may be used to electrically connect these electrodes to the grounded regions of the knob interface 150 (e.g., the electrodes 430). Based on the electrodes in the center of the fixed base 231 (e.g., the electrodes 1602, 1604, and/or 1606) being used for sensing signals, the transparent conductive material 1506 may be used to electrically connect these electrodes to the sensing regions of the knob interface 150 (e.g., the sensing electrodes 410 and 411).

In some examples, the transparent conductive material 1506 might not cover the entire center region (e.g., may cover electrodes 1602, but not cover electrodes 1604). In such examples, another type of pattern (e.g., the transparent conductive material 1506 may include non-conductive material or other types of patterns) may be used, which ensures that any optical mismatch in the center region of the knob interface 150 to be reduced.

Figure 17:
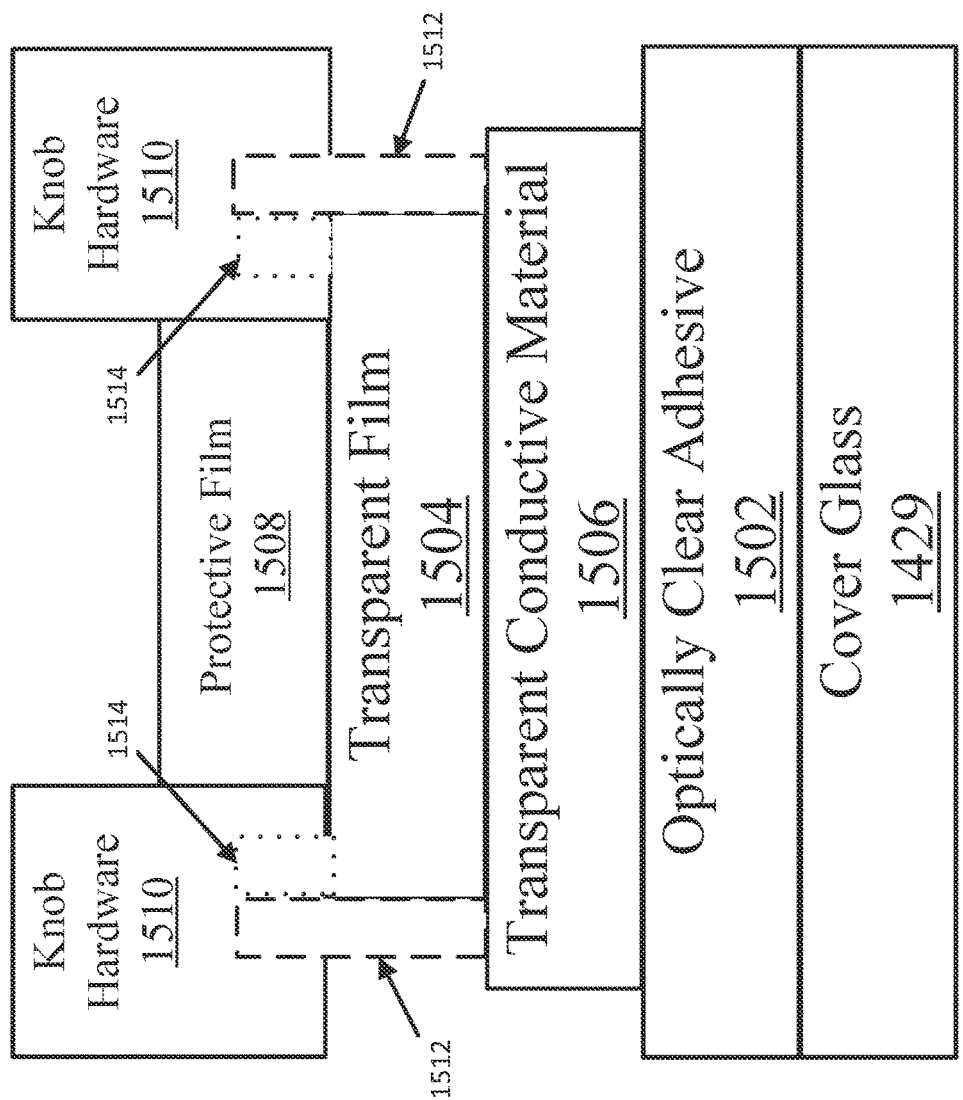
FIG. 17 depicts yet another schematic cross-section of an example rotatable knob interface, implemented on an example input device having a sensing grid, according to one or more examples.

FIG. 17 depicts another schematic cross-section of an example rotatable knob interface, implemented on an example input device having a sensing grid, according to one or more examples. For instance, in contrast to FIG. 15, the transparent conductive material 1506 and the transparent film 1504 are reversed. For example, in FIG. 15, the transparent conductive material 1506 is placed on top of the transparent film 1504 (e.g., closer to the cover glass 1429 and the input device 100). In FIG. 17, the transparent conductive material 1506 is placed below the transparent film 1504. Due to the transparent conducive material 1506 being placed below the transparent film 1504, the transparent conductive material 1506 and the transparent film 1504 include additional legs 1512 and 1514 that are placed within the knob hardware 1510. For instance, the transparent conductive material 1506 include legs 1512 such that the transparent conductive material 1506 can still electrically couple the grid electrodes 401 (e.g., the electrodes 1602, 1604, or 1606) to the electrodes of the knob interface 150 (e.g., the electrodes 410, 411, and 430). The transparent film 1504 includes the legs 1514 that are also included within the knob hardware 1510. The legs 1512 and 1514 may be bent to a specified radius to prevent cracks or stress fractures of the transparent conductive material 1506 and/or the transparent film 1504. The legs 1512 and/or 1514 may further be used to electrically connect to the rest of the knob hardware 1510.

In some examples, the knob interface 150 may use larger inner diameters and/or smaller outer diameters. For instance, referring to FIG. 4A, the fixed base 231 includes an inner diameter (e.g., the interior of the circle) and an outer diameter (e.g., the outside of the circle). Due to the larger inner diameters and smaller outer diameters, this may limit the space that may be used to capacitively couple between the knob hardware (e.g., the electrodes 410 and 430 of the knob interface 150) and the touch pixels (e.g., the grid electrodes 401 such as electrodes 402 and 403). This may limit certain functions such as ground, guard or sensing functions, which may impact the features. By using the transparent conductive material 1506, more capacitive coupling between these electrodes may be used as the center region electrodes (e.g., the electrodes within the inner diameter) may be coupled to the knob electrodes. Furthermore, by using the transparent conductive material 1506 (e.g., to connect more grid electrodes to the reference electrodes 430), this may improve the signal to noise (SNR) ratio.

In some instances, the processing system 110 may use a sensing scheme for the knob interface by sensing a column of touch pixels (e.g., grid electrodes) at a time (e.g., six pixels within a first column of touch pixels (referred to as group A) in one time instance, and then the next column of electrodes such as the next six pixels (referred to as group B)). For instance, referring to FIG. 4A, the processing system 110 may use the sensing scheme to sense a first column of pixels (e.g., a column of pixels or electrodes such as the column of pixels 412), and then the next column of pixels (e.g., the column of pixels to the right of column 412). While Group A is sensing, the Group B, which are the neighboring set of touch pixels, are also driven with the similar or same sensing waveform as Group A, but they are not capturing any signal data. Groups B and A are close enough that if one picks up noise, the other could be affected. This may be used to prevent Group B from coupling to any external signals/noise from the environment, which could affect signals on Group A. This may be referred to as guarding.

In some variations, the transparent conductive material 1506 is patterned on both sides and connected via holes that are plated. The transparent conductive material 1506 may include a conductive pattern on the bottom side of the film closest to the cover glass, which reduces the distance of the conductive pattern to the touch grid (e.g., the grid electrodes 401) by the thickness of the film. The top side of the transparent conductive material 1506 may be routed towards the top side of the film to connect to the rest of the knob hardware 1510 underneath the knob base. This may eliminate any bends compared to the single sided conductive material 1506. In some instances, the transparent conductive material 1506 may include only a single side of conductive pattern.

Figure 18:
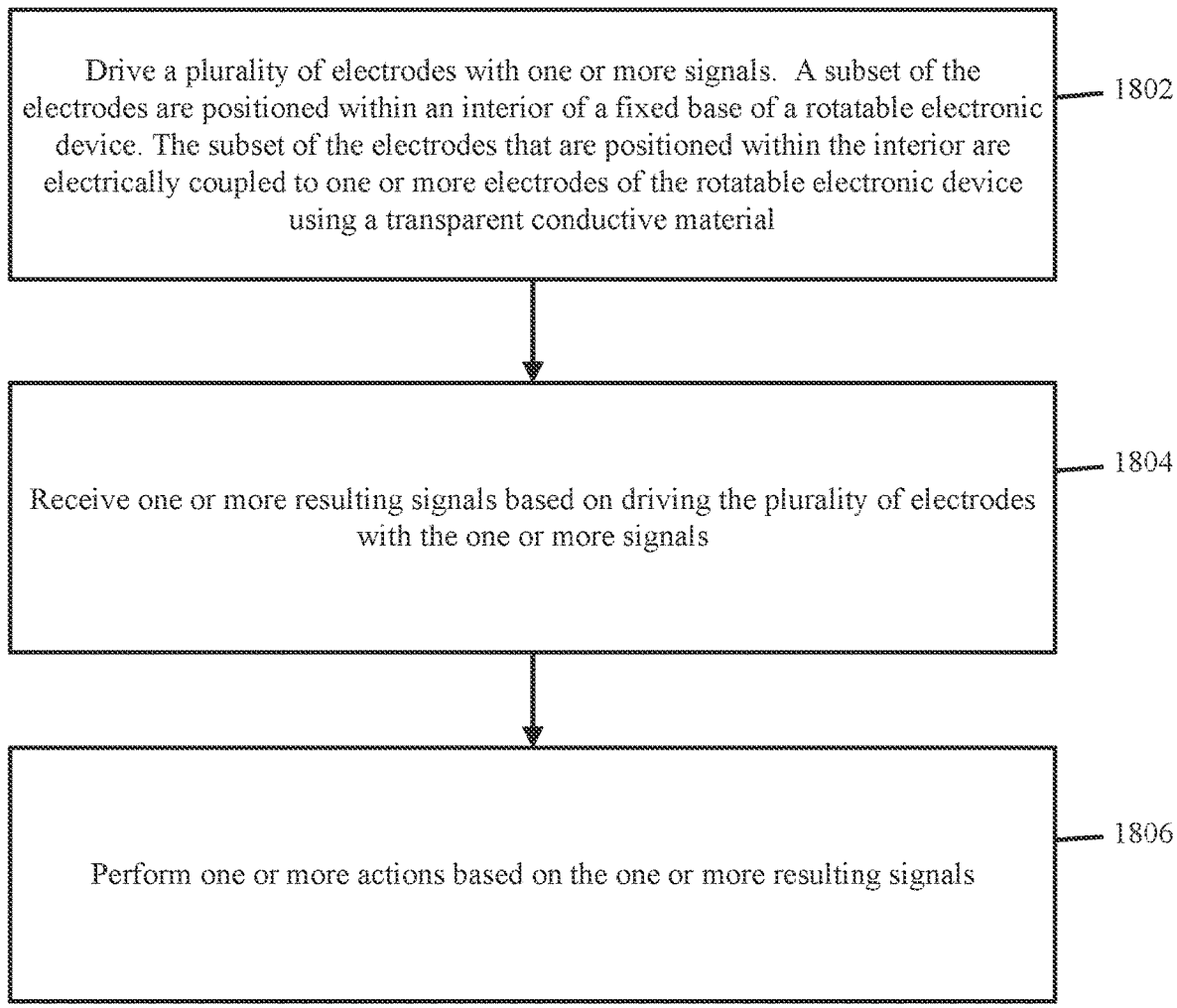
FIG. 18 is a flowchart of an exemplary process for using a transparent conductive material for a knob interface according to one or more examples of the present disclosure.

FIG. 18 is a flowchart of an exemplary process for using a transparent conductive material for a knob interface according to one or more examples of the present disclosure. The process 1800 may be performed by the electronic device 100 and in particular, the processing system 110 shown in FIG. 1. However, it will be recognized that an input device that includes additional and/or fewer components as shown in FIG. 1 may be used to perform process 1800, that any of the following blocks may be performed in any suitable order, and that the process 1800 may be performed in any suitable environment. The descriptions, illustrations, and processes of FIG. 18 are merely exemplary and the process 1800 may use other descriptions, illustrations, and processes for using a transparent conductive material for a knob interface.

In operation, at block 1802, the processing system 110 may drive a plurality of electrodes with one or more signals. A subset of the electrodes (e.g., the electrodes 1602, 1604, and 1606 shown in FIG. 16 and/or electrode 2012 shown in FIG. 20) are positioned within an interior diameter of a fixed base (e.g., fixed base 231) of a rotatable electronic device (e.g., the knob interface 150). The subset of electrodes that are positioned within the interior are electrically coupled to one or more electrodes of the rotatable electronic device using a transparent conductive material (e.g., the transparent conductive material 1506 shown in FIGS. 15 and 17).

For example, as mentioned above, the processing system 110 may drive the sensor electrodes 125 of the electronic device 100 with one or more signals such as sensing signals, ground or reference signals, and/or guard signals. Referring to FIG. 16 and FIGS. 4A-4C, the sensor electrodes 125 may be split into a grid of electrodes 401, and the grid of electrodes 401 may include reference electrodes 403, sensing electrodes 402, and the interior electrodes 1602, 1604, and 1606. The reference electrodes 403 may be provided with reference signals and the sensing electrodes 402 may be provided with sensing signals. Furthermore, using the transparent conductive material 1506 (e.g., a trace within the material 1506), one or more electrodes that are within the interior of the fixed base 231 are also used. For instance, the electrodes 1602, 1604, 1606 and/or other electrodes that are within the inner diameter of the fixed base 231 (e.g., electrode 2012 in FIG. 20) may be provided with reference signals, sensing signals, and/or other signals (e.g., guard signals).

At block 1804, the processing system 110 receives one or more resulting signals based on driving the plurality of electrodes with the one or more signals. For instance, the processing system 110 may receive resulting or resultant signals from the sensing electrodes 402 and/or the interior electrodes 1602, 1604, 1606 and/or other interior electrodes. For instance, in some examples, the interior electrodes may be used for grounding or guard. In such instances, the processing system 110 may receive resulting signals from the sensing electrodes 402 and not from any of the interior electrodes. In other examples, the interior electrodes may be used for sensing. In such examples, the processing system 110 may receive resulting signals from the interior electrodes. In yet other instances, the interior electrodes may be used for both ground, guard, and/or sensing. In such instances, the processing system 110 may receive the resulting signals from the interior electrodes that are used for sensing.

At block 1806, the processing system 110 may perform one or more actions based on the one or more resulting signals. For instance, the processing system 110 may perform one or more functionalities such as determining a rotation of the knob interface 150, a click or compression of the knob interface 150, a grab of the knob interface 150, and/or other functionalities described above.

Figure 19:
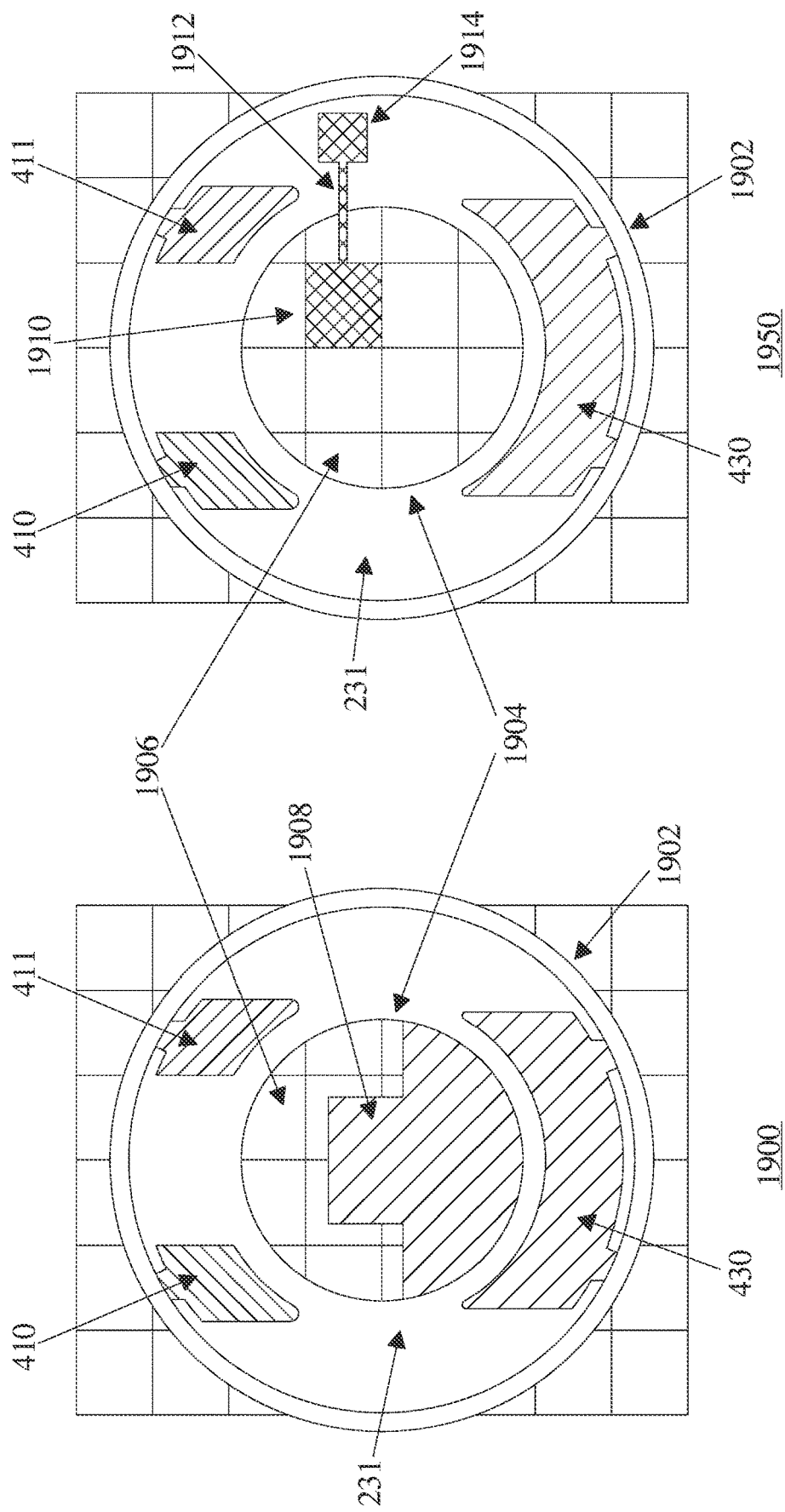
FIG. 19 illustrates another underside view of the fixed base of example rotatable knob interfaces according to one or more examples of the present disclosure.

As mentioned above, in some instances, the center area with the transparent conductive material may be used for grounding and/or additional grounding and the touch detection may be disabled. Further, in other instances, the center area with the transparent conductive material may be used for additional sensing functions. This is shown in FIG. 19. For instance, FIG. 19 illustrates another underside view of the fixed base of example rotatable knob interfaces according to one or more examples of the present disclosure. For example, similar to FIG. 16, the rotatable knob interfaces 1900 and 1950 show the fixed base 231, the electrodes of the fixed base including the electrodes 410 and 411 (e.g., the sensing electrodes) and the electrodes 430. Further, the outer diameter 1902 of the fixed base 231 and the inner diameter 1904 of the fixed base 231 are shown. Additionally, the center area 1906 (e.g., the donut-shaped hole or the interior region of the fixed base 231) is also shown. In some instances, the center area 1906 may include the transparent conductive material (e.g., ITO), and may be used for grounding and/or additional grounding. For example, referring to the rotatable knob interface 1900, the center area 1906 such as the shaded region 1908 within the center area 1906 may be used for grounding and/or additional grounding (e.g., if the electrodes 430 are used for grounding, then the shaded region 1908 may indicate electrodes that are used as additional grounding). In some variations, when using the center area 1906 for grounding and/or additional grounding, touch detection may be disabled. For example, in such variations, the center area 1906 may be used for additional grounding, where the touch pixels (e.g., the grid electrodes within the center area 1906) are connected to ground and cannot perform any sensing. Thus, finger touches (e.g., a user's finger or other body part or input object) touching this region would not produce a signal that can be used for sensing functions.

In some variations, the center area 1906 with the transparent conductive material may be used for additional sensing functions. For instance, a touch pixel (e.g., touch pixel 2012 shown in FIG. 20) may be used as an additional sensing electrode (e.g., similar to the sensing electrodes 410 and 411 shown above). For instance, the touch pixel may be connected to (e.g., electrically coupled to) a conductive pattern 1910. The conductive pattern 1910 may connect to the fixed base 231 via a bridge 1912. For instance, the fixed base 231 may include an electrode 1914 (e.g., a knob interface electrode). The conductive pattern 1910 may connect to the knob interface electrode 1914 via the bridge (e.g., a trace or wire) 1912. The conductive pattern 1910 that is positioned over the grid electrode, the bridge 1912, and/or the knob interface electrode 1914 may comprise and/or be made of a transparent conductive material such as ITO. In other words, the transparent conductive material (e.g., the transparent conductive material 1506 shown in FIG. 15) may include the conductive pattern 1910, the bridge 1912, and/or the knob interface electrode 1914. By using the touch pixel and the transparent conductive material, the touch pixel may be used for perform one or more sensing functions such as click, grab, and so on. In other words, a part of the center area 1906 (e.g., the touch pixel) is used for sensing for another knob feature such as click or grab/grasp. The touch pixel as well as other touch pixels within the center area 1906 may be driven by the processing system 110 with a sensing waveform for sensing touches. For instance, based on the sensing waveform from the processing system 110, the touch pixel (e.g., a grid electrode) may be electrically coupled to an electrode 1914 of the fixed base 231 via the transparent conductive material (e.g., the conductive pattern 1910 and the bridge 1912). The electrode 1914 may be sensing electrode such as a knob interface electrode that is configured to perform similarly to the sensing electrodes 410 and 411 described above. This is described in further detail in FIG. 20. In some instances, the features performed by the sensing electrodes (e.g., sensing electrodes 410, 411, and/or 420) described above such as rotation or click may be performed using the touch pixel. In some examples, the processing system 110 (e.g., the firmware) may be able to distinguish between the touch detection in the center area 1906 versus the applied sensing function (e.g., click, grab, and so on).

FIG. 20 illustrates yet another underside view of the fixed base of example rotatable knob interfaces according to one or more examples of the present disclosure. For instance, FIG. 20 shows a rotatable knob interface 2000 with a touch pixel 2012 (e.g., the touch pixel that is described in FIG. 19). Additionally, FIG. 20 shows additional touch pixels (e.g., electrodes such as grid electrodes 401 described above) that surround the touch pixel 2012 such as touch pixels 2002-2010. A vertex 2012 or center of the rotatable knob interface 2000 is also shown. FIG. 20 also shows another rotatable knob interface 2050 that shows the transparent conductive material such as the conductive pattern 1910. For instance, as mentioned above, the conductive pattern 1910 may be placed on top of the touch pixel 2012. As such, the rotatable knob interface 2000 shows the touch pixel 2012 and the rotatable knob interface 2050 shows the conductive pattern 1910 that is placed on top of the touch pixel 2012. The touch pixel 2012 may be electrically coupled to the conductive pattern 1910. In operation, if an input object (e.g., a user's finger) touches the rotatable knob interface 2000, the touch pixel 2012 may detect the touch. For instance, a signal distribution may be spread across 3-4 touch pixels depending on the size of the input object (e.g., how large of an area of the user's finger is placed on the rotatable knob interface 2000). The signal or the magnitude of the signal may also increase. If the input object touch is centered on the touch pixel 2012, the magnitude of the signal of the touch pixel 2012 may be higher than the surrounding touch pixels. For instance, the magnitude of the signal of the touch pixel 2012 may be 400 analog to digital (ADC) whereas the magnitude of the touch pixels 2002, 2004, 2008 and 2010 may be 150 ADC. If the touch is centered at the vertex 2012, the magnitude of the signal of the touch pixel 2012 and the touch pixels 2004, 2006, and 2008 may be 250 ADC.

In some variations, the knob interface 2000 may be used for click, grab, or grasp functions. For instance, the transparent conductive material (e.g., ITO pattern) may be designed such that the material covers a designated number of touch pixels (e.g., 1-2 touch pixels). In knob interfaces 2000 and 2050, the touch pixel 2012 is shown with the transparent conductive material (e.g., the conductive pattern 1910) placed on top of the touch pixel 2012. In such instances, any changes in signal whether from click or grasp function may optimally affect only the touch pixel 2012. Some bleed out of the signal may occur at the neighboring touch pixels (e.g., touch pixels 2002, 2004, 2008, and 2010), but may be minimal. The overall signal value may be much lower than a finger response signal. For instance, the touch pixel 2012 may detect a magnitude of the signal of 200 ADC whereas the touch pixels 2002, 2004, 2008, and 2010 may detect a magnitude of the signal of 70 ADC.

Figure 21:
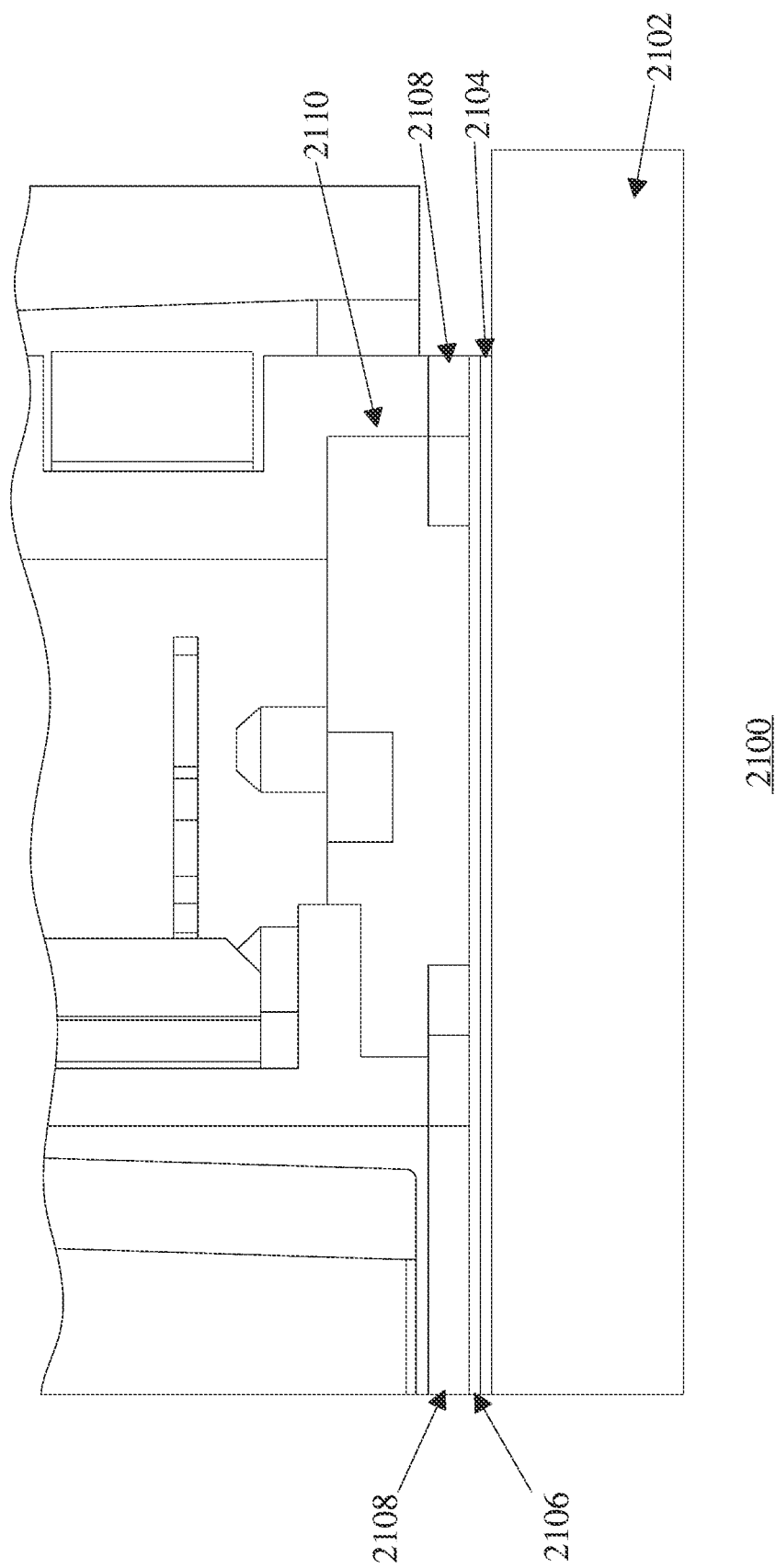
FIGS. 21-23 depict schematic cross-sections of example rotatable knob interfaces according to one or more examples of the present disclosure.
Figure 22:
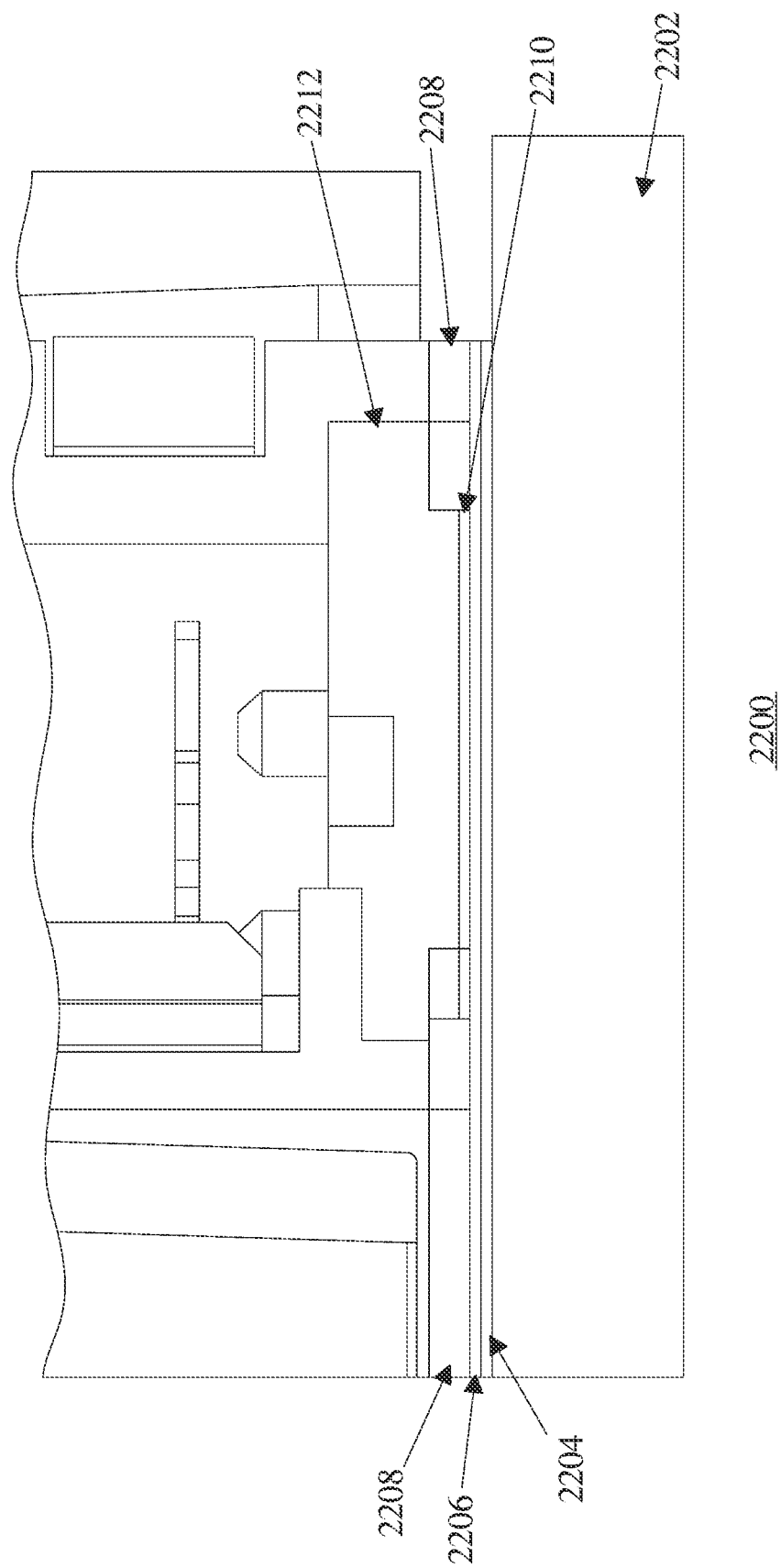
Figure 23:
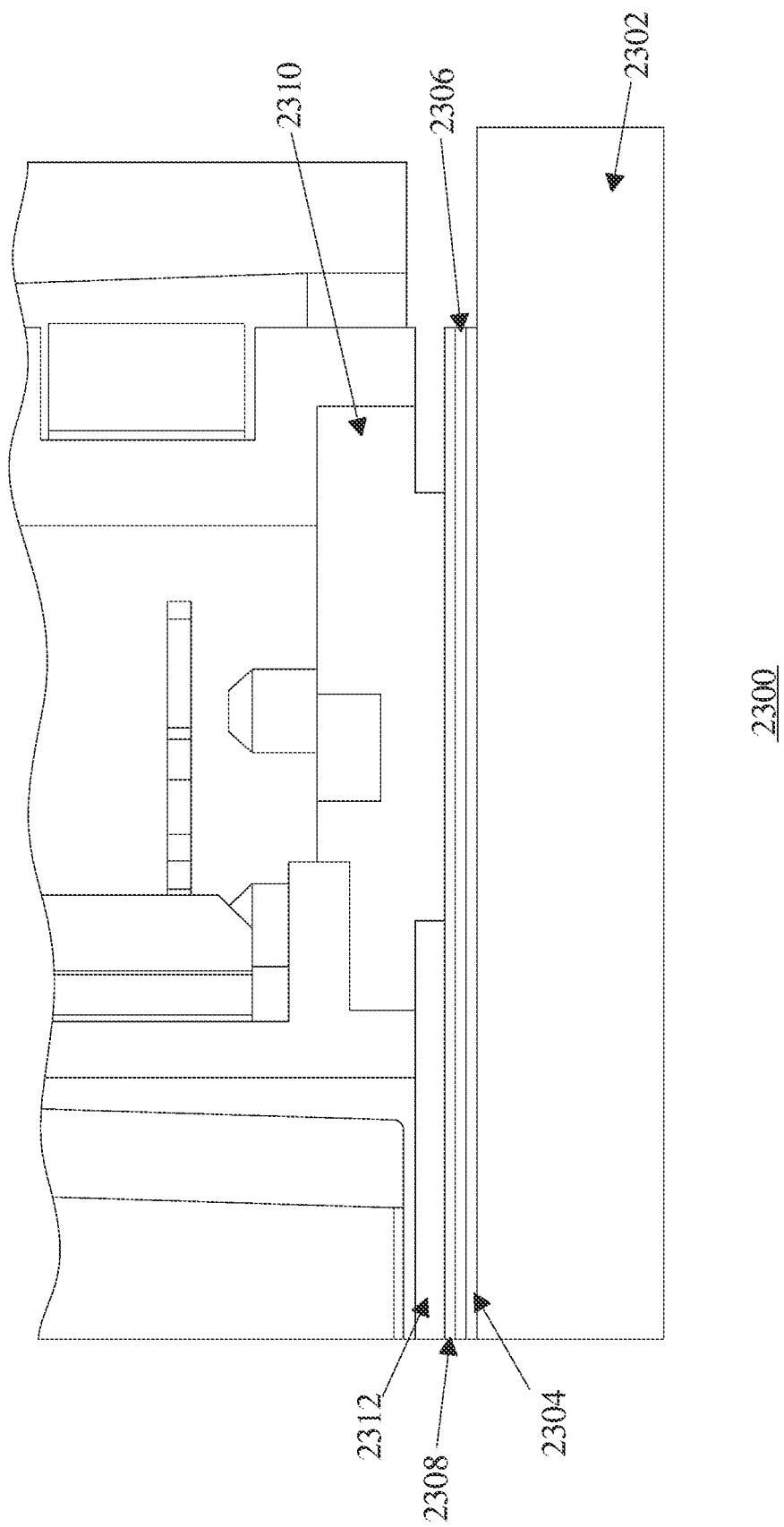

FIGS. 21-23 depict schematic cross-sections of example rotatable knob interfaces according to one or more examples of the present disclosure. For instance, referring to the knob interface 2100, starting from the bottom, a cover glass 2102 is shown. The cover glass 2102 may be similar to the cover glass 1429 of FIGS. 14 and 15. The next layer is the optical adhesive layer 2104, which may be similar to the optical adhesive layer 1502 described in FIG. 15. The next layer is the transparent conductive material layer 2106, which may be similar to the transparent conductive material 1506 described in FIG. 15 and above. The next layer is an adhesive layer 2108 that covers portions of the transparent conductive material 2106. Furthermore, the knob conductive pads 2110 are also shown. The knob conductive pads (e.g., pads 237, 238) described above may be part of, associated with, and/or separate from the knob conductive pads 2110. For instance, in some examples, the fixed base 231 (e.g., the knob base) may comprise plastic and/or sheet metal. In other examples, the fixed base 231 may comprise a rigid printed circuit board (PCB) and/or a flexible PCB (FPC). In examples where the fixed base 231 comprises plastic and/or sheet metal, the conductive pads 2110 described above may be connected to the transparent conductive material (e.g., the conductive pattern 1910, the bridge 1912, and/or the electrode 1914), which then connects to the grid electrode(s) (e.g., the electrode 2012) using a piece of conductive material such as copper or brass. In examples where the fixed base 231 comprises a PCB and/or FPC, the connection may be made through vias (e.g., an electrical connection between copper layers in a PCB and/or FPC). In some variations, the pads 2110 may also be used for the inner ring 232 and/or the peripheral ring 235 described in FIG. 8.

In the knob interface 2100, the knob conductive pad 2110 is in direct physical contact with the conductive transparent material 2106 (e.g., a conductive transparent substrate). The adhesives 2108 are on the outer edge and hold the two pieces together.

Referring to FIG. 22, the knob interface 2200 is similar to the knob interface 2100 of FIG. 21. For instance, the knob interface 2200 includes the cover glass 2202, the optically clear adhesive 2204, the transparent conductive material 2206, the adhesive 2208, and the knob conductive pad 2212. In addition, the knob interface 2200 includes a layer 2210 between the knob conductive pad 2212 and the transparent conductive material 2206. The layer 2210 may be an anisotropic conductive film (ACF), which is used to electrically bond the transparent conductive material 2206 to the knob conductive pad 2212. In some variations, as mentioned above, the knob conductive pad 2212 may be composed of and/or include a flexible/rigid printed circuit board (FPC/PCB) that interacts with the transparent conductive material 2206. This may ensure a strong electrical contact between the knob conductive pad 2212 and the conductive transparent material 2206.

Referring to FIG. 23, the knob interface 2300 is similar to the knob interface 2100 and 2200 of FIGS. 21 and 22. For instance, the knob interface 2300 includes the cover glass 2302, the optically clear adhesive 2304, the conductive transparent material 2306, the adhesive 2308, and the knob conductive pad 2310. Further, the knob interface 2300 includes an extension 2312 of the knob conductive 2310 that extends outwards. The adhesive layer 2308 is extended to cover the entire region of the knob conductive pad 2310, including the extension 2312. For instance, if the knob conductive pads 2310 are larger in dimension, the adhesive 2308 is used to bond to the conductive transparent material 2306. The knob conductive pad 2310 is not in direct electrical contact to the conductive transparent material 2306 in this configuration. By using this configuration, a stronger adhesion bond is created due to the increased bonding area.

Figure 24:
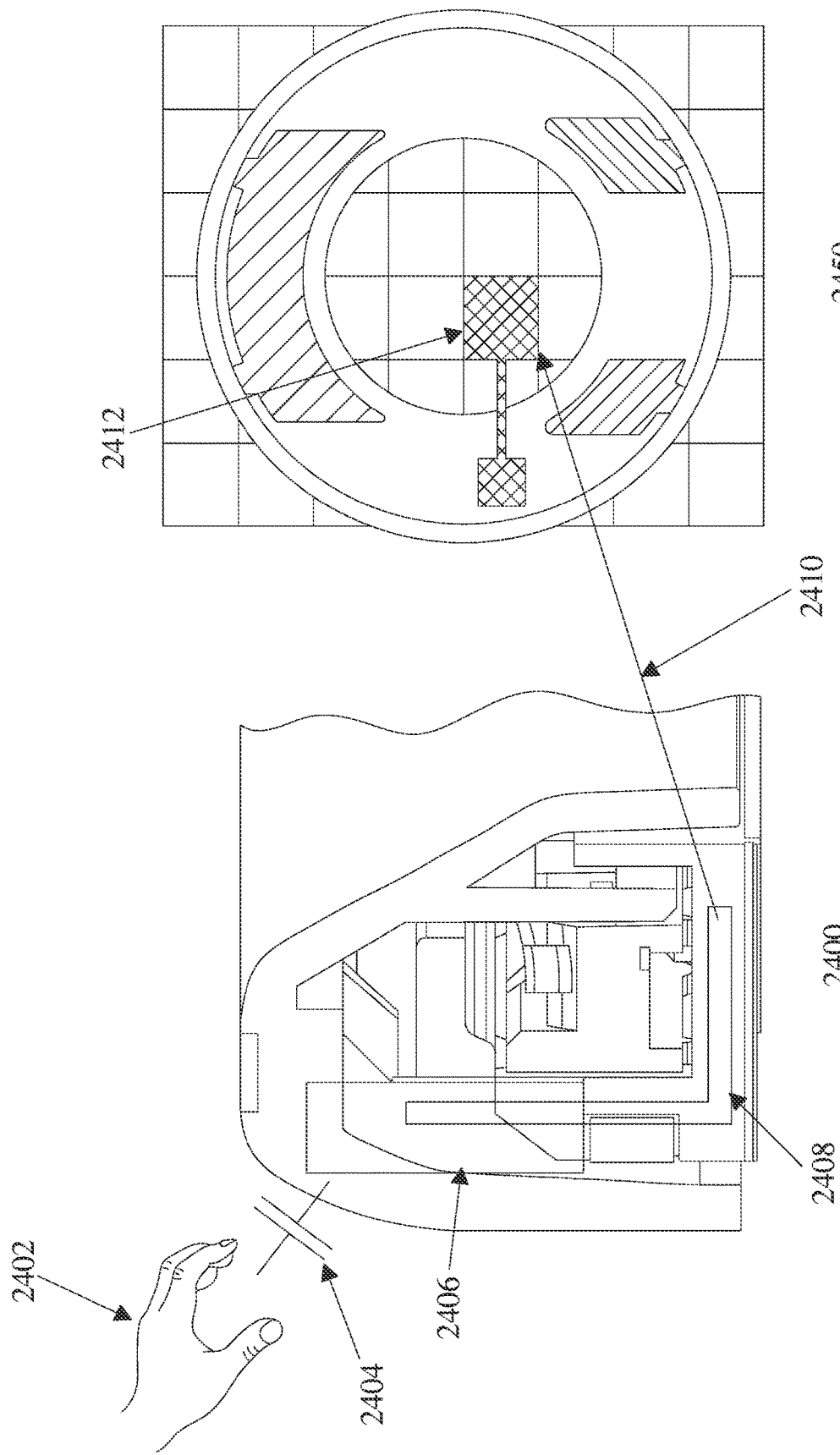
FIG. 24 depicts a mapping between a schematic cross-section of an example rotatable knob interface and an underside view of the fixed base of the example rotatable knob interface according to one or more examples of the present disclosure.

FIG. 24 depicts a mapping between a schematic cross-section of an example rotatable knob interface and an underside view of the fixed base of the example rotatable knob interface according to one or more examples of the present disclosure. For instance, the rotatable knob interface 2400 and the underside view 2450 of the fixed base may be used for the knob grasp (e.g., grab) feature described above. For instance, an input object 2402 (e.g., a user's hand) may grasp or grab the knob 2404. The conductive material 2406 is wrapped around the knob body that provides an electrical coupling to the input object 2402 when the knob 2404 is grabbed. This is routed by section 2408 to the conductive pad for the grabbing of the knob 2404 to be sensed by the sensing pixel 2412 that is located near the center of the knob interface 2400 (e.g., within the center area). For example, FIG. 24 shows the mapping 2410 between the cross-section area of the knob interface 2400 to the underside view of the fixed base with the sensing pixel 2412. The sensing pixel 2412 is coupled to the transparent pattern conductive film. The pattern couples the signal from sensing pixel 2412 to an electrode on the fixed base of the knob interface 2400 such as the conductive material 2406 in this case. By using this, the sensing pixel 2412 within the center area of the knob interface 2400 may be used for sensing an input object such as the input object 2402 grabbing the knob 2404.

As used herein, including in the claims, the term "circuitry" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments are described herein. Variations of those exemplary embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A system for using a transparent conductive material layer for a knob interface, comprising:
the knob interface comprising a fixed base and one or more knob interface electrodes, wherein the fixed base comprises an outer diameter and an inner diameter;
a plurality of grid electrodes positioned below the knob interface, wherein a subset of the plurality of grid electrodes are positioned within the inner diameter of the fixed base;
the transparent conductive material layer configured to electrically couple the subset of the plurality of grid electrodes to the one or more knob interface electrodes; and
a processing system configured to:
drive the plurality of grid electrodes with one or more signals, wherein driving the plurality of grid electrodes comprises driving the subset of the plurality of grid electrodes that are electrically coupled to the one or more knob interface electrodes via the transparent conductive material layer;
receive one or more resulting signals based on driving the plurality of grid electrodes with the one or more signals; and perform one or more actions based on the one or more resulting signals.

2. The system of claim 1, wherein the transparent conductive material layer is an indium tin oxide (ITO) layer or a metal-mesh layer that electrically couples the subset of the plurality of grid electrodes to the one or more knob interface electrodes.

3. The system of claim 1, wherein the transparent conductive material layer is positioned between the fixed base of the knob interface and the plurality of grid electrodes, and wherein a cover glass is positioned between the plurality of grid electrodes and the transparent conductive material layer.

4. The system of claim 3, wherein a transparent film layer and an optically clear adhesive are positioned between the cover glass and the transparent conductive material layer.

5. The system of claim 3, wherein an optically clear adhesive is positioned between the cover glass and the transparent conductive material layer, wherein a transparent film layer is positioned between the transparent conductive material layer and the fixed base, and wherein the transparent conductive material layer comprises one or more legs that electrically couple the subset of the plurality of grid electrodes to the one or more knob interface electrodes.

6. The system of claim 3, wherein the knob interface comprises one or more conductive pads, and wherein the transparent conductive material layer is in direct electrical contact with the one or more conductive pads or the transparent conductive material layer is in close proximity and has sufficient overlapping area to one or more regions of the one or more conductive pads with an adhesive in between them, wherein the overlapping area and the close proximity creates a strong capacitive coupling between the transparent conductive material layer and the one or more conductive pads.

7. The system of claim 3, wherein the knob interface comprises one or more conductive pads, and wherein an adhesive layer is positioned between the one or more conductive pads and the transparent conductive material layer and is configured to provide an adhesion bond between the one or more conductive pads and the transparent conductive material layer.

8. The system of claim 1, wherein the subset of the plurality of grid electrodes comprises one or more reference electrodes, wherein the one or more signals comprises a reference signal, and wherein driving the plurality of grid electrodes comprises driving the one or more reference electrodes of the subset of the plurality of grid electrodes with the reference signal.

9. The system of claim 1, wherein the subset of the plurality of grid electrodes comprises one or more sensing electrodes, wherein the one or more signals comprises a sensing signal, wherein driving the plurality of grid electrodes comprises driving the one or more sensing electrodes of the subset of the plurality of grid electrodes with the sensing signal, and wherein receiving the one or more resulting signals comprises receiving resulting signals from the one or more sensing electrodes of the subset of the plurality of grid electrodes.

10. The system of claim 9, wherein the resulting signals from the one or more sensing electrodes indicate a rotational direction of the knob interface.

11. The system of claim 9, wherein the resulting signals from the one or more sensing electrodes indicate a magnitude of rotation of the knob interface.

12. The system of claim 9, wherein the resulting signals from the one or more sensing electrodes indicate a compression state of the knob interface, and wherein performing the one or more actions comprises:
   determining the compression state indicates compression of the knob interface; and
   performing an action based on the compression of the knob interface.

13. The system of claim 9, wherein the resulting signals from the one or more sensing electrodes indicate an input object grabbing the knob interface, and wherein performing the one or more actions comprises performing an action based on the input object grabbing the knob interface.

14. A method for using a transparent conductive material layer for a knob interface, comprising:
   driving a plurality of grid electrodes with one or more signals, wherein the knob interface comprises a fixed base and one or more knob interface electrodes, wherein the fixed base comprises an outer diameter and an inner diameter, wherein the plurality of grid electrodes are positioned below the knob interface, wherein a subset of the plurality of grid electrodes are positioned within the inner diameter of the fixed base, wherein the transparent conductive material layer is configured to electrically couple the subset of the plurality of grid electrodes to the one or more knob interface electrodes, and wherein driving the plurality of grid electrodes comprises driving the subset of the plurality of grid electrodes that are electrically coupled to the one or more knob interface electrodes via the transparent conductive material layer;
   receiving one or more resulting signals based on driving the plurality of grid electrodes with the one or more signals; and
   performing one or more actions based on the one or more resulting signals.

15. The method of claim 14, wherein the subset of the plurality of grid electrodes comprises one or more reference electrodes, wherein the one or more signals comprises a reference signal, and wherein driving the plurality of grid electrodes comprises driving the one or more reference electrodes of the subset of the plurality of grid electrodes with the reference signal.

16. The method of claim 14, wherein the subset of the plurality of grid electrodes comprises one or more sensing electrodes, wherein the one or more signals comprises a sensing signal, wherein driving the plurality of grid electrodes comprises driving the one or more sensing electrodes of the subset of the plurality of grid electrodes with the sensing signal, and wherein receiving the one or more resulting signals comprises receiving resulting signals from the one or more sensing electrodes of the subset of the plurality of grid electrodes.

17. The method of claim 16, wherein the resulting signals from the one or more sensing electrodes indicate a rotational direction and a magnitude of rotation of the knob interface.

18. The method of claim 16, wherein the resulting signals from the one or more sensing electrodes indicate an input object grabbing the knob interface, and wherein performing the one or more actions comprises performing an action based on the input object grabbing the knob interface.

19. The method of claim 14, wherein the transparent conductive material layer is an indium tin oxide (ITO) layer or a metal-mesh layer that electrically couples the subset of the plurality of grid electrodes to the one or more knob interface electrodes.

20. A non-transitory computer-readable medium having processor-executable instructions stored thereon, the processor-executable instructions, when executed, facilitating performance of the following:
  driving a plurality of grid electrodes with one or more signals, wherein a knob interface comprises a fixed base and one or more knob interface electrodes, wherein the fixed base comprises an outer diameter and an inner diameter, wherein the plurality of grid electrodes are positioned below the knob interface, wherein a subset of the plurality of grid electrodes are positioned within the inner diameter of the fixed base, wherein a transparent conductive material layer is configured to electrically couple the subset of the plurality of grid electrodes to the one or more knob interface electrodes, and wherein driving the plurality of grid electrodes comprises driving the subset of the plurality of grid electrodes that are electrically coupled to the one or more knob interface electrodes via the transparent conductive material layer;
  receiving one or more resulting signals based on driving the plurality of grid electrodes with the one or more signals; and
  performing one or more actions based on the one or more resulting signals.

* * * * *